US010427526B2

(12) United States Patent
Tajima et al.

(10) Patent No.: US 10,427,526 B2
(45) Date of Patent: Oct. 1, 2019

(54) ELECTRIC VEHICLE

(71) Applicant: HONDA MOTOR CO., LTD., Tokyo (JP)

(72) Inventors: Takamitsu Tajima, Wako (JP); Yasuji Shibahata, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 101 days.

(21) Appl. No.: 15/129,585

(22) PCT Filed: Feb. 19, 2015

(86) PCT No.: PCT/JP2015/054664
§ 371 (c)(1),
(2) Date: Sep. 27, 2016

(87) PCT Pub. No.: WO2015/146393
PCT Pub. Date: Oct. 1, 2015

(65) Prior Publication Data
US 2017/0129342 A1    May 11, 2017

(30) Foreign Application Priority Data

Mar. 28, 2014    (JP) .................................. 2014-070457

(51) Int. Cl.
*B60L 9/22* (2006.01)
*B60G 17/016* (2006.01)
(Continued)

(52) U.S. Cl.
CPC .............. *B60L 9/22* (2013.01); *B60G 17/017* (2013.01); *B60G 17/0162* (2013.01); *B60L 5/36* (2013.01);
(Continued)

(58) Field of Classification Search
CPC .... B60L 9/22; B60L 2260/32; B60L 2210/42; B60L 15/2036; B60L 11/1861;
(Continued)

(56) References Cited

U.S. PATENT DOCUMENTS 5,424,713 A * 6/1995 Thompson ............... B60Q 1/52
200/61.44
9,346,361 B2 * 5/2016 Francke .................... B60L 5/08
(Continued)

FOREIGN PATENT DOCUMENTS

| CN | 1130135 A | 9/1996 |
|---|---|---|
| CN | 102092296 A | 6/2011 |

(Continued)

OTHER PUBLICATIONS

Extended (Supplementary) European Search Report dated Nov. 14, 2017, issued in counterpart European application No. 15767797.2. (9 pages).

(Continued)

*Primary Examiner* — Jerrah Edwards
*Assistant Examiner* — Mathew Franklin Gordon
(74) *Attorney, Agent, or Firm* — Westerman, Hattori, Daniels & Adrian, L.L.P.

(57) ABSTRACT

Provided is an electric vehicle in which the state of contact between an electric connection arm and an external power line can be stabilized during traveling of the electric vehicle. In the electric vehicle, when the free end of an electric connection arm contacts an external power line during traveling of the electric vehicle, a posture control device controls the posture of the vehicle body so that the rotation angle of the electric connection arm approaches a target rotation angle or a target rotation angle range.

6 Claims, 16 Drawing Sheets

(51) Int. Cl.
| | |
|---|---|
| *B60L 11/18* | (2006.01) |
| *B60L 15/20* | (2006.01) |
| *B60L 5/36* | (2006.01) |
| *B60M 1/30* | (2006.01) |
| *B60T 8/17* | (2006.01) |
| *B60T 8/171* | (2006.01) |
| *B62D 17/00* | (2006.01) |
| *B62D 5/04* | (2006.01) |
| *B62D 6/04* | (2006.01) |
| *B60G 17/017* | (2006.01) |
| *B60L 5/38* | (2006.01) |
| *B60L 5/40* | (2006.01) |
| *B60L 5/39* | (2006.01) |
| *B60L 53/14* | (2019.01) |
| *B60L 53/16* | (2019.01) |
| *B60L 50/51* | (2019.01) |
| *B60L 53/35* | (2019.01) |
| *B60L 53/36* | (2019.01) |
| *B60L 58/12* | (2019.01) |
| *B60K 1/04* | (2019.01) |

(52) U.S. Cl.
CPC .............. *B60L 5/38* (2013.01); *B60L 5/39* (2013.01); *B60L 5/40* (2013.01); *B60L 15/2036* (2013.01); *B60L 50/51* (2019.02); *B60L 53/14* (2019.02); *B60L 53/16* (2019.02); *B60L 53/35* (2019.02); *B60L 53/36* (2019.02); *B60L 58/12* (2019.02); *B60M 1/30* (2013.01); *B60T 8/171* (2013.01); *B60T 8/1701* (2013.01); *B62D 5/04* (2013.01); *B62D 6/04* (2013.01); *B62D 17/00* (2013.01); *B60G 2300/50* (2013.01); *B60G 2800/01* (2013.01); *B60K 1/04* (2013.01); *B60L 2210/10* (2013.01); *B60L 2210/42* (2013.01); *B60L 2260/32* (2013.01); *B60Y 2200/91* (2013.01); *B60Y 2400/112* (2013.01); *B60Y 2400/114* (2013.01); *Y02T 10/7005* (2013.01); *Y02T 10/7072* (2013.01); *Y02T 10/7258* (2013.01); *Y02T 90/121* (2013.01); *Y02T 90/125* (2013.01); *Y02T 90/14* (2013.01)

(58) Field of Classification Search
CPC .............. B60L 11/1833; B60L 11/1827; B60L 11/1818; B60L 11/1816; B60L 2210/10; B60L 5/40; B60L 5/39; B60L 5/38; B60L 5/36; B60L 11/1803; Y02T 90/14; Y02T 90/125; Y02T 90/121; Y02T 10/7258; Y02T 10/7072; Y02T 10/7005; B60Y 2400/114; B60Y 2400/112; B60Y 2200/91; B60K 1/04; B60G 2800/01; B60G 2300/50; B60G 17/017; B60G 17/0162; B62D 17/00; B62D 6/04; B62D 5/04; B60T 8/171; B60T 8/1701; B60M 1/30

See application file for complete search history.

(56) References Cited

U.S. PATENT DOCUMENTS

| | | | |
|---|---|---|---|
| 9,527,394 B1 * | 12/2016 | Tang | .................. B60L 11/1818 |
| 2005/0217921 A1 | 10/2005 | Mori et al. | |
| 2014/0095006 A1 | 4/2014 | Saito et al. | |
| 2015/0291210 A1 * | 10/2015 | Kageyama | ............ B60T 8/1755 |
| | | | 701/41 |

FOREIGN PATENT DOCUMENTS

| | | |
|---|---|---|
| EP | 2284635 A1 | 2/2011 |
| JP | 2010-241294 A | 10/2010 |
| JP | 2011-131618 A | 7/2011 |
| JP | 2011-167042 A | 8/2011 |
| JP | 2013-5539 A | 1/2013 |
| JP | 2013-208008 A | 10/2013 |
| JP | 2013-233037 A | 11/2013 |
| WO | 2013005528 A1 | 1/2013 |

OTHER PUBLICATIONS

Office Action dated Jun. 28, 2017, issued in counterpart Chinese Application No. 201580016782.0, with English translation (8 pages).
International Search Report dated Apr. 21, 2015, issued in counterpart International Application No. PCT/JP2015/054664 (1 page).

* cited by examiner

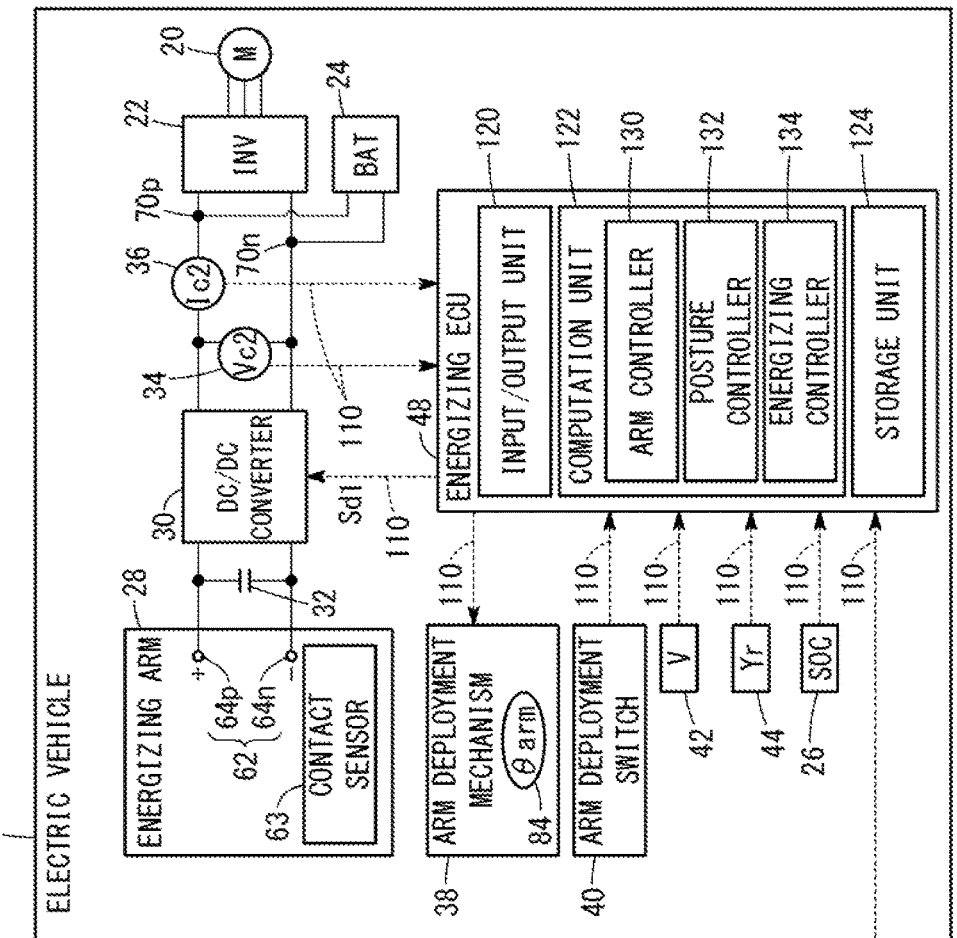
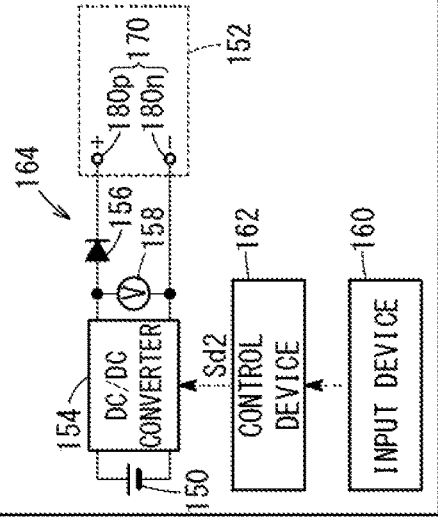
FIG. 1

FIG. 7

| DIFFERENCE $\Delta\theta_{arm}$ (= TARGET ARM ANGLE $\theta_{armtar}$ - DETECTION ANGLE $\theta_{arm}$) | STEERING DIRECTION $D_{str}$ OF STEERING SYSTEM (BASED ON CHANGE AMOUNT $\Delta\theta_{str}$ of STEERING ANGLE PER UNIT TIME (= $\Delta\theta_{str}$ (CURRENT) - $\theta_{str}$ (PREVIOUS))) | TARGET STEERING REACTION FORCE $F_{strtar}$ |
|---|---|---|
| POSITIVE (VEHICLE TOO CLOSE WITH RESPECT TO EXTERNAL POWER LINES) | DIRECTION TO APPROACH POWER LINES | LARGE |
| | DIRECTION AWAY FROM POWER LINES | SMALL |
| | NO CHANGE (MAINTAIN STEERING ANGLE) | MEDIUM |
| NEGATIVE (VEHICLE TOO FAR WITH RESPECT TO EXTERNAL POWER LINES) | DIRECTION TO APPROACH POWER LINES | SMALL |
| | DIRECTION AWAY FROM POWER LINES | LARGE |
| | NO CHANGE (MAINTAIN STEERING ANGLE) | MEDIUM |
| 0 DISTANCE BETWEEN EXTERNAL POWER LINES AND VEHICLE IS APPROPRIATE | DIRECTION TO APPROACH POWER LINES | LARGE |
| | DIRECTION AWAY FROM POWER LINES | LARGE |
| | NO CHANGE (MAINTAIN STEERING ANGLE) | SMALL |

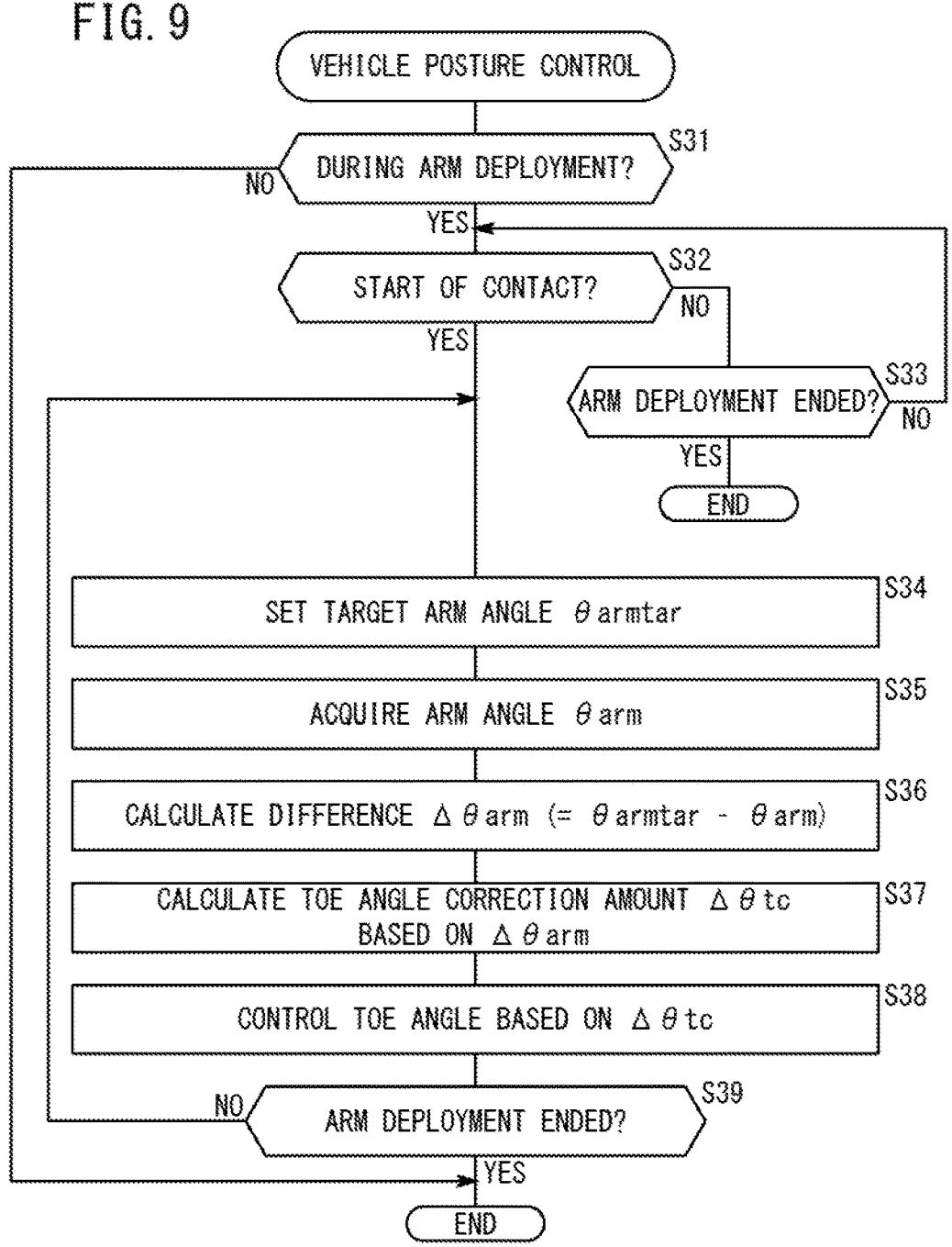

FIG. 10

| DIFFERENCE $\Delta\theta arm$ (= TARGET ARM ANGLE $\theta armtar$ − DETECTION ANGLE $\theta arm$) | CORRECTION OF TOE ANGLE $\theta t$ |
|---|---|
| POSITIVE (VEHICLE TOO CLOSE WITH RESPECT TO EXTERNAL POWER LINES) | CORRECT SO AS TO MOVE AWAY FROM POWER LINES |
| NEGATIVE (VEHICLE TOO FAR WITH RESPECT TO EXTERNAL POWER LINES) | CORRECT SO AS TO APPROACH POWER LINES |
| 0 DISTANCE BETWEEN EXTERNAL POWER LINES AND VEHICLE IS APPROPRIATE | NO CORRECTION |

FIG. 13

| DIFFERENCE $\Delta\theta_{arm}$ (= TARGET ARM ANGLE $\theta_{armtar}$ − DETECTION ANGLE $\theta_{arm}$) | CORRECTION OF LEFT AND RIGHT DRIVE POWER DISTRIBUTION RATIO Pd (CALCULATION OF DRIVE POWER DISTRIBUTION RATIO CORRECTION AMOUNT $\Delta Pdc$) |
|---|---|
| POSITIVE (VEHICLE TOO CLOSE WITH RESPECT TO EXTERNAL POWER LINES) | CORRECT SO AS TO MOVE AWAY FROM POWER LINES |
| NEGATIVE (VEHICLE TOO FAR WITH RESPECT TO EXTERNAL POWER LINES) | CORRECT SO AS TO APPROACH POWER LINES |
| 0 DISTANCE BETWEEN EXTERNAL POWER LINES AND VEHICLE IS APPROPRIATE | NO CORRECTION |

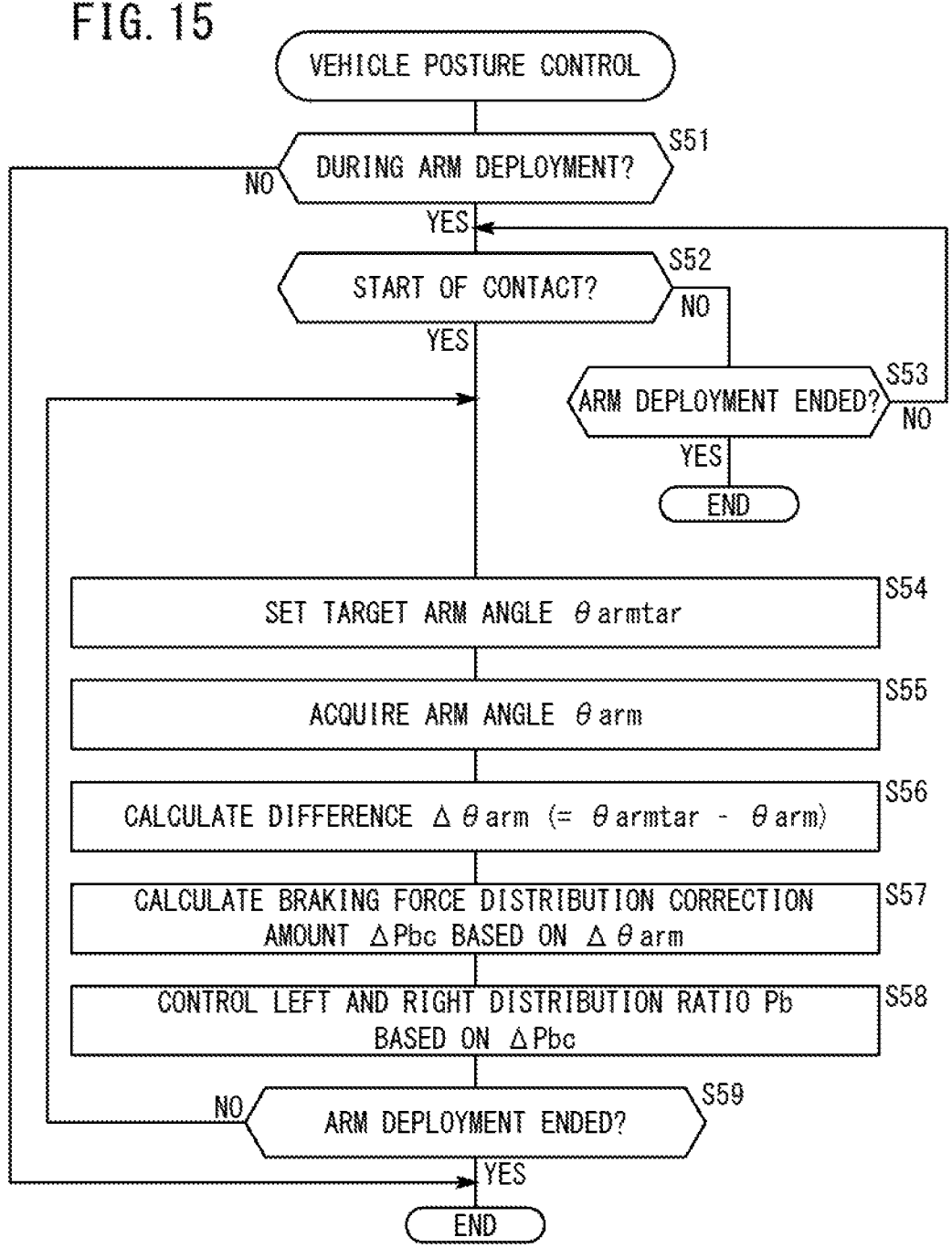

FIG. 16

| DIFFERENCE $\Delta\theta arm$ (= TARGET ARM ANGLE $\theta armtar$ - DETECTION ANGLE $\theta arm$) | CORRECTION OF LEFT AND RIGHT BRAKING FORCE DISTRIBUTION RATIO Pb (CALCULATION OF BRAKING FORCE DISTRIBUTION RATIO CORRECTION AMOUNT $\Delta Pbc$) |
|---|---|
| POSITIVE (VEHICLE TOO CLOSE WITH RESPECT TO EXTERNAL POWER LINES) | CORRECT SO AS TO MOVE AWAY FROM POWER LINES |
| NEGATIVE (VEHICLE TOO FAR WITH RESPECT TO EXTERNAL POWER LINES) | CORRECT SO AS TO APPROACH POWER LINES |
| 0 DISTANCE BETWEEN EXTERNAL POWER LINES AND VEHICLE IS APPROPRIATE | NO CORRECTION |

ELECTRIC VEHICLE

TECHNICAL FIELD

The present invention relates to an electric vehicle equipped with an energizing arm used for charging or supplying power through contact with external power lines.

BACKGROUND ART

As disclosed in Japanese Laid-Open Patent Publication No. 2013-233037 (hereinafter referred to as "JP 2013-233037A"), during traveling of an electric vehicle 10, a charging arm 18 is extended out in a vehicle transverse direction, and charging from a power supplying apparatus 26 is carried out by bringing the charging arm 18 into contact with power lines 24 made up from a positive electrode power line 24p and a negative electrode power line 24n (see Abstract). A direct current or an alternating current high voltage is applied to the power lines 24 from a non-illustrated external power source (see paragraph [0023]). Contact between the charging arm 18 and the power lines 24 is carried out by moving an actuator 38 on a slide rail 37 to thereby extend the charging arm 18 (see paragraphs [0034], [0035], [0045]).

SUMMARY OF INVENTION

As noted above, according to JP 2013-233037A, the charging arm 18 and the power lines 24 are placed in contact by moving the actuator 36 on the slide rail 37 to thereby extend the charging arm 18 (see paragraphs [0034], [0035], [0045]). More specifically, alignment of the charging arm 18 and the power lines 24 is performed by adjusting the posture of the electric vehicle 10 by a driver operating a steering system.

In the case that the charging arm 18 (energizing arm) is placed in contact with aerial power lines 24 (external power lines) during traveling of the electric vehicle 10, there is a concern that the contact state may become unstable accompanying changes (including movement) of the posture of the vehicle body caused by traveling of the vehicle. If the contact state becomes unstable in this manner, alternating states may occur between contact and non-contact, and there is a possibility that trouble will be caused, such as generation of arcing between the charging arm 16 and the power lines 24 or the like.

The present invention has been devised taking into consideration the aforementioned problems, and has the object of providing an electric vehicle which is capable of stabilizing the contact state between an energizing arm and external power lines during traveling.

An electric vehicle according to the present invention comprises a power source, an energizing arm including a fixed end connected rotatably with respect to a vehicle body, a free end configured to be capable of being displaced in a vehicle widthwise direction accompanying rotation at the fixed end, and a conductive member arranged between the fixed end and the free end, and within the conductive member, the fixed end side being connected electrically with the power source, an angle detector configured to detect an angle of rotation of the energizing arm, a contact detector configured to detect contact of the free end with respect to external power lines, and a posture control device configured to control a posture of the vehicle body, wherein during traveling of the electric vehicle, when the contact detector detects contact of the free end, the posture control device is configured to control the posture of the vehicle body so that the angle of rotation of the energizing arm approaches a target angle of rotation or a range of target angles of rotation.

According to the present invention, when the free end of the energizing arm comes into contact with the external power lines, the posture of the vehicle body is controlled so that the angle of rotation of the energizing arm approaches a target angle of rotation or a range of target angles of rotation. Consequently, contact of the energizing arm with respect to the external power lines can be made stable.

More specifically, in the case that the free end of the energizing arm is placed in contact with the external power lines during traveling of the electric vehicle, there is a concern that the contact state may become unstable accompanying changes (including movement) of the posture of the vehicle body caused by traveling of the vehicle. If the contact state becomes unstable, alternating states may occur between contact and non-contact, and there is a possibility that trouble will be caused, such as generation of arcing between the free end and the external power lines. According to the present invention, it is possible for such a defect to be prevented.

The electric vehicle may be equipped with an electric power steering mechanism, wherein the electric power steering mechanism comprises a steering system, a steering reaction force imparting device configured to impart a reaction force to the steering system, and a steering reaction force control device configured to control the steering reaction force imparting device, and the steering reaction force control device is configured to generate the steering reaction force in the steering reaction force imparting device so as to suppress a change in a steering angle of the steering system, in an event it is determined that the angle of rotation coincides with the target angle of rotation or in an event it is determined that, the angle of rotation lies within the range of target angles of rotation, and generate the steering reaction force in the steering reaction force imparting device so as to cause the angle of rotation to approach the target angle of rotation or the range of target angles of rotation, in an event it is determined that the angle of rotation does not coincide with the target angle of rotation or in an event it is determined that the angle of rotation does not lie within the range of target angles of rotation.

In accordance with this feature, the steering operation of the driver can be guided so as to maintain the contact state between the free end of the energizing arm and the external power lines.

The electric vehicle may further comprise a toe angle control actuator configured to control a toe angle of steered wheels, and a toe angle control device configured to control the toe angle control actuator, wherein the toe angle control device is configured to control the toe angle control actuator so as to suppress a change in the toe angle, in an event it is determined that the angle of rotation coincides with the target angle of rotation or in an event it is determined that the angle of rotation lies within the range of target angles of rotation, and control the toe angle control actuator so as to cause the angle of rotation to approach the target angle of rotation or the range of target angles of rotation, in an event it is determined that the angle of rotation does not coincide with the target angle of rotation or in an event, it is determined that the angle of rotation does not lie within the range of target angles of rotation.

In accordance with this feature, the toe angle of the steered wheels can be adjusted automatically so as to maintain the contact state between the free end of the energizing arm and the external power lines.

The electric vehicle may further comprise a drive power distribution adjusting mechanism configured to adjust a drive power distribution of left and right drive wheels, wherein the drive power distribution adjusting mechanism is configured to maintain the drive power distribution, in an event it is determined that the angle of rotation coincides with the target angle of rotation or in an event, it is determined that the angle of rotation lies within the range of target, angles of rotation, and change the drive power distribution so as to cause the angle of rotation to approach the target angle of rotation or the range of target angles of rotation, in an event it is determined that the angle of rotation does not coincide with the target angle of rotation or in an event it is determined that the angle of rotation, does not lie within the range of target angles of rotation.

In accordance with this feature, the drive power distribution of the left and right drive wheels can be adjusted automatically so as to maintain the contact state between the free end of the energizing arm and the external powder lines.

The electric vehicle may further comprise a braking force distribution adjusting mechanism configured to adjust a braking force distribution of left and right wheels, wherein the braking force distribution adjusting mechanism is configured to maintain the braking force distribution, in an event, it is determined that the angle of rotation coincides with the target, angle of rotation or in an event it is determined that the angle of rotation lies within the range of target angles of rotation, and change the braking force distribution so as to cause the angle of rotation to approach the target angle of rotation or the range of target angles of rotation, in an event it is determined that the angle of rotation does not coincide with the target angle of rotation or in an event it is determined that the angle of rotation does not lie within the range of target angles of rotation.

In accordance with this feature, the braking force distribution of the left and right wheels can be adjusted automatically so as to maintain the contact state between the free end of the energizing arm and the external power lines.

An electric vehicle according to the present invention comprises a power source, an energizing arm including on one end a power receiving portion that contacts external power lines arranged in a line shape (i.e., linearly or in a curved manner) along a travel path, and another end of which is connected electrically to the power source, an arm displacement mechanism configured to displace the energizing arm outwardly of a vehicle body during traveling, and a posture control device configured to, when the electric vehicle is traveling while the power receiving portion is in contact with the external power lines, maintain or change a posture of the electric vehicle so as to maintain a predetermined contact state between the external power lines and the power receiving portion, or so as to bring about the predetermined contact state.

According to the present invention, when the electric vehicle is traveling while the power receiving portion of the charging arm is in contact with the external power lines, the posture of the electric vehicle is maintained or changed so as to maintain a predetermined contact state between the external power lines and the power receiving portion, or so as to bring about the predetermined contact state. In accordance with this feature, it is possible to easily control the relative positioning of the electric vehicle with respect to the external power lines during traveling of the electric vehicle.

Further, for example, in the case that the posture of the electric vehicle is maintained or changed so as to maintain the predetermined contact state, the contact pressure between the external power lines and the power receiving portion can easily be maintained during charging to the power source from the exterior or during supply of power to the exterior from the power source. Consequently, it is unlikely for arcing to take place between the external power lines and the power receiving portion, and charging to the power source or supply of power from the power source can foe carried out in a stable manner.

BRIEF DESCRIPTION OF DRAWINGS

FIG. 1 is an outline schematic view of a charging system equipped with an electric vehicle according to a first embodiment of the present, invention;

FIG. 7 is a descriptive view in relation to a target steering reaction force in the first embodiment;

FIG. 9 is a flowchart of a vehicle body posture control in the second embodiment;

FIG. 10 is a descriptive view in relation to correction of a toe angle in the second embodiment;

FIG. 13 is a descriptive view in relation to correction of a drive power distribution ratio in the third embodiment;

FIG. 15 is a flowchart of a vehicle body posture control in the fourth embodiment; and FIG. 16 is a descriptive view in relation to correction of a braking force distribution ratio in the fourth embodiment.

DESCRIPTION OF EMBODIMENTS

I. First Embodiment

1A. Configuration
[1A-1. Overall Configuration]

Figure 2:
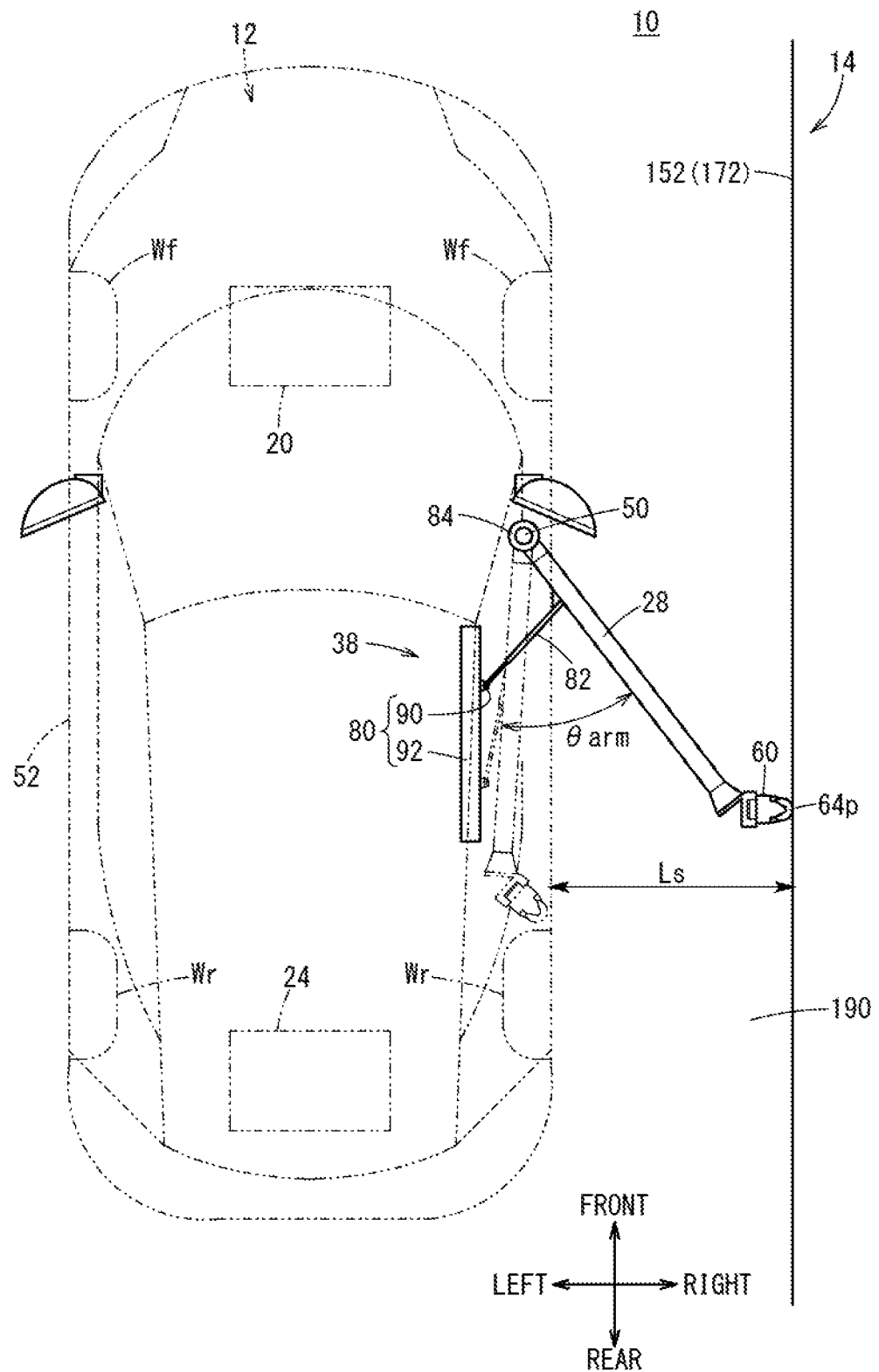
FIG. 2 is a plan view showing with emphasis portions of the charging system in the first embodiment.
Figure 3:
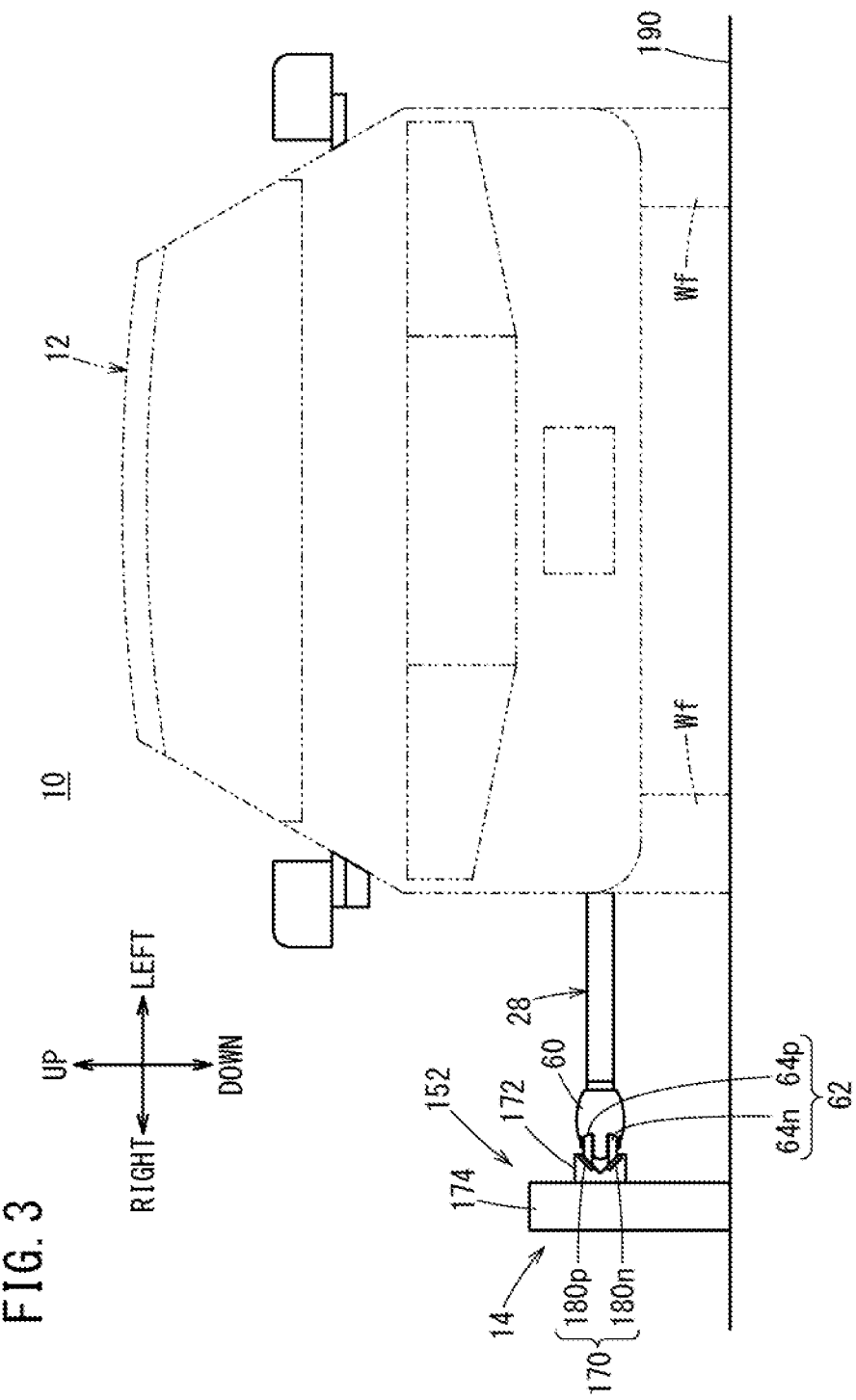
FIG. 3 is a front view showing with emphasis portions of the charging system in the first embodiment.

FIG. 1 is an outline schematic view of a charging system 10 equipped with an electric vehicle 12 according to a first embodiment of the present invention. FIG. 2 is a plan view showing with emphasis portions of the charging system 10. FIG. 3 is a front view showing with emphasis portions of the charging system 10. As shown in FIGS. 1 through 3, the charging system 10, in addition to the electric vehicle 12 (hereinafter also referred to as a "vehicle 12"), includes an external power supplying apparatus 14 (hereinafter also referred to as a "power supplying apparatus 14"). Any of the directions ("front", "rear", "left", "right", "up", "down") in FIGS. 2 and 3 are directions on the basis of the vehicle 12 (the same holds true for FIG. 4).

According to the first embodiment, electrical power is supplied to the vehicle 12 from the power supplying apparatus 14, and charging of a battery 24 (see FIG. 1) for traveling of the vehicle 12 is performed. Conversely, electrical power may be supplied from the vehicle 12 to an external device (power supplying apparatus 14, etc.).

[1A-2. Electric Vehicle 12]

(1A-2-1. Overall Configuration of Electric Vehicle 12)

As shown in FIGS. 1 through 3, the vehicle 12 includes a traction motor 20 (hereinafter also referred to as a "motor 20"), an inverter 22, the battery 24 for traveling (hereinafter also referred to as a "battery 24"), an SOC sensor 26, an energizing arm 28, a DC/DC converter 30, a capacitor 32, a voltage sensor 34, a current sensor 36, an arm deployment mechanism 38 (hereinafter referred to as a "deployment mechanism 38"), an arm deployment switch 40, a vehicle velocity sensor 42, a yaw rate sensor 44, an electric power steering mechanism 46 (hereinafter referred to as an "EPS mechanism 46"), and an energizing electronic control unit 48 (hereinafter referred to as an "energizing ECU 48" or an "ECU 48").

(1A-2-2. Traction Motor 20)

The traction motor 20 is a 3-phase brushless type of motor, which generates a drive power F [N] (or a torque [N·m]) for the vehicle 12 on the basis of electrical power supplied from the battery 24 through the inverter 22. Further, the motor 20 carries out charging of the battery 24 by outputting to the battery 24 power (regenerative power Preg) [W] produced by performing a regenerative operation. The regenerative power Preg may also be output to a step-down converter, a low-voltage battery, and auxiliary devices, none of which are shown.

(1A-2-3. Inverter 22)

The inverter 22 is constituted as a 3-phase full-bridge type, which converts a DC current from the battery 24 into a 3-phase AC current and supplies the same to the motor 20, whereas accompanying a regenerative operation, supplies a DC current to the battery 24 following AC/DC conversion.

(1A-2-4. Battery 24 and SOC Sensor 26)

The battery 24 is an energy storage device (energy storage) including a plurality of battery cells, and for example, a lithium ion secondary battery, a nickel-metal hydride battery, or the like, can be used therefor. Alternatively, in place of the battery 24 or in addition to the battery 24, an energy storage device such as a capacitor or the like can be used. A non-illustrated DC/DC converter may be disposed between the inverter 22 and the battery 24, and an output voltage from the battery 24 or an output voltage from the motor 20 may be stepped-up or stepped-down in voltage.

The SOC sensor 26 detects a remaining capacity (SOC: State of Charge) of the battery 24 and outputs the same to the ECU 48.

(1A-2-5. Energizing Arm 28)

The energizing arm 28 (hereinafter referred to as an "arm 28") is a site that is placed in contact with the power supplying apparatus 14 when the battery 24 is charged with electrical power from the power supplying apparatus 14. As shown in FIG. 2, the arm 28 is connected to a vehicle body 52 at a location between the front wheels Wf and the rear wheels Wr, with one end (fixed end) thereof being capable of rotating about an axis of rotation 50. Therefore, the energizing arm 26 is capable of being deployed (or displaced) transversely or laterally of the vehicle 12 (on the right side in the present embodiment) at a time of contact with the power supplying apparatus 14.

An energizing head 60 including a power receiving portion 62 (energizing portion) and a contact sensor 63 is provided on a distal end of the energizing arm 28. The power receiving portion 62 includes a positive electrode terminal 64p and a negative electrode terminal 64n. The positive electrode terminal 64p and the negative electrode terminal 64n are connected electrically with a fixed end side through respective non-illustrated conductive members. The vehicle 12 and the power supplying apparatus 14 are connected electrically by the power receiving portion 62 being placed in contact with external power lines 170 of the power supplying apparatus 14.

The contact sensor 63 serves to detect contact between the energizing head 60 and the external power supplying apparatus 14 (later described external power lines 170), and is constituted, for example, from a pressure sensor disposed on a portion of the energizing head 60. Alternatively, the contact sensor 63 may be constituted as a voltage sensor that is arranged between the power receiving portion 62 and the converter 30.

Concerning the principal structure of the charging arm 28, for example, the configuration disclosed in JP 2013-233037A can be used.

(1A-2-6. DC/DC. Converter 30)

The DC/DC converter 30 (hereinafter also referred to as a "converter 30" or a "vehicle side converter 30") converts an output voltage of the power supplying apparatus 14 (hereinafter referred to as an "output voltage Vs" or a "power supply voltage Vs") and outputs the same to the inverter 22 and the battery 24. According to the present embodiment, the converter 30 steps-down the power supply voltage Vs, and outputs the same to the side of the vehicle 12. However, the converter 30 may carry out only stepping-up of the power supply voltage Vs, or may carry out both stepping-up and stepping-down in voltage thereof.

(1A-2-7. Capacitor 32)

The capacitor 32 is arranged between the power receiving portion 62 of the arm 28 and the converter 30. The capacitor 32, for example, suppresses voltage fluctuations by temporarily storing the electric power from the power supplying apparatus 14.

(1A-2-8. Voltage Sensor 34 and Current Sensor 36)

The voltage sensor 34 is arranged between the DC/DC converter 30 and branch points 70p, 70n, and detects a voltage (hereinafter referred to as a "converter output voltage Vc2", "a converter secondary voltage Vc2", or a "secondary voltage Vc2") on a secondary side (output side) of the DC/DC converter 30.

The current sensor 36 is arranged between the DC/DC converter 30 and the branch point 70p, and detects a current (hereinafter referred to as a "converter output current Ic2", "a converter secondary current Ic2", or a "secondary current Ic2") on the secondary side of the DC/DC converter 30.

(1A-2-3. Arm Deployment Mechanism 38 and Arm Deployment Switch 40)

The arm deployment mechanism 38 (arm displacement mechanism) serves to deploy the arm 28, and as shown in FIG. 2, includes a slider unit 80, a damper unit 82, and an arm angle sensor 84 (hereinafter referred to as an "angle sensor 84" or a "sensor 84"). The slider unit 80 includes a slider 90 and a slider support member 92. Based on a command from the ECU 48, the slider 90 is capable of sliding with respect to the slider support member 92. The slider 90, for example, is an electromagnetic or a pneumatic type of linear actuator.

One end (first end) of the damper unit 82 is connected rotatably to the slider 90, and another end (second end) thereof is connected rotatably to the arm 28. When the arm 28 is deployed, the slider 90 is displaced to the front side of the vehicle 12, and the first end of the damper unit 82 is displaced forward. When the arm 28 is housed, the slider 90 is displaced to the rear side of the vehicle 12, and the first end of the damper unit 82 is displaced rearward.

The angle sensor 84 serves to detect and angle of rotation of the arm 28 (hereinafter referred to as an "angle of rotation θarm", an "arm angle θarm", or a "detection angle θarm") [deg], and for example, is constituted by a potentiometer. The angle of rotation θarm in this case, for example, can be an angle that uses as a reference an initial position of the arm 28 (the position shown by the two-dot-dashed line in FIG. 2). Alternatively, the angle of rotation θarm may be defined as an angle with respect to an imaginary line (not shown) that passes through the axis of rotation 50 in a longitudinal direction of the vehicle 12.

The arm deployment switch 40 (hereinafter also referred to as a "deployment switch 40" or a "switch 40") serves to issue a command for deployment of the arm 28 in accordance with an operation from the user. The switch 40, for example, is formed on a portion of a steering system 100 (in particular, the steering wheel) (see FIG. 1). When the switch 40 is turned on, the arm 28 is deployed through the deployment mechanism 38, and when the switch 40 is turned off, the arm 28 is accommodated through the deployment mechanism 38.

(1A-2-10. Vehicle Velocity Sensor 42 and Yaw Rate Sensor 44)

The vehicle velocity sensor 42 detects a vehicle velocity V [km/h] of the vehicle 12. The yaw rate sensor 44 detects a yaw rate Yr [deg/sec] of the vehicle 12.

(1A-2-11. EPS Mechanism 46)

The EPS mechanism 46, in addition to the steering system 100 (in this case, including the steering column), includes an EPS motor 102, a steering angle sensor 104 (hereinafter also referred to as an "angle sensor 104" or a "sensor 104"), and an EPS electronic control unit 106 (hereinafter referred to as an "EPS ECU 106").

Based on a command from the EPS ECU 106, the EPS motor 102 imparts a reaction force Fstr (hereinafter also referred to as a "steering reaction force Fstr") with respect to the steering system 100. The steering angle sensor 104 detects a steering angle θstr of the steering system 100.

The EPS ECU 106 controls the steering reaction force Fstr generated by the EPS motor 102 on the basis of the steering angle θstr, the vehicle velocity V, and the yaw rate Yr, etc. The EPS ECU 106 includes an input/output unit, a computation unit, and a storage unit, none of which are shown.

(1A-2-12. ECU 48)

The ECU 48 serves to control reception of inputs from respective components of the vehicle 12 or to control the respective components themselves through a vehicle side communications line 110 (see FIG. 1), and includes an input/output unit 120, a computation unit 122, and a storage unit 124. In the present embodiment, the computation unit 122 of the ECU 48 includes an arm controller 130, a posture controller 132, and an energizing controller 134. The arm controller 130 controls the energizing arm 28 through the arm deployment mechanism 38. The posture controller 132 controls the posture of the vehicle 12 (vehicle body 52) through the EPS mechanism 46. The energizing controller 134 controls charging of the battery 24 or supply of power from the battery 24.

[1A-3. External Power Supplying Apparatus 14]

Figure 4:
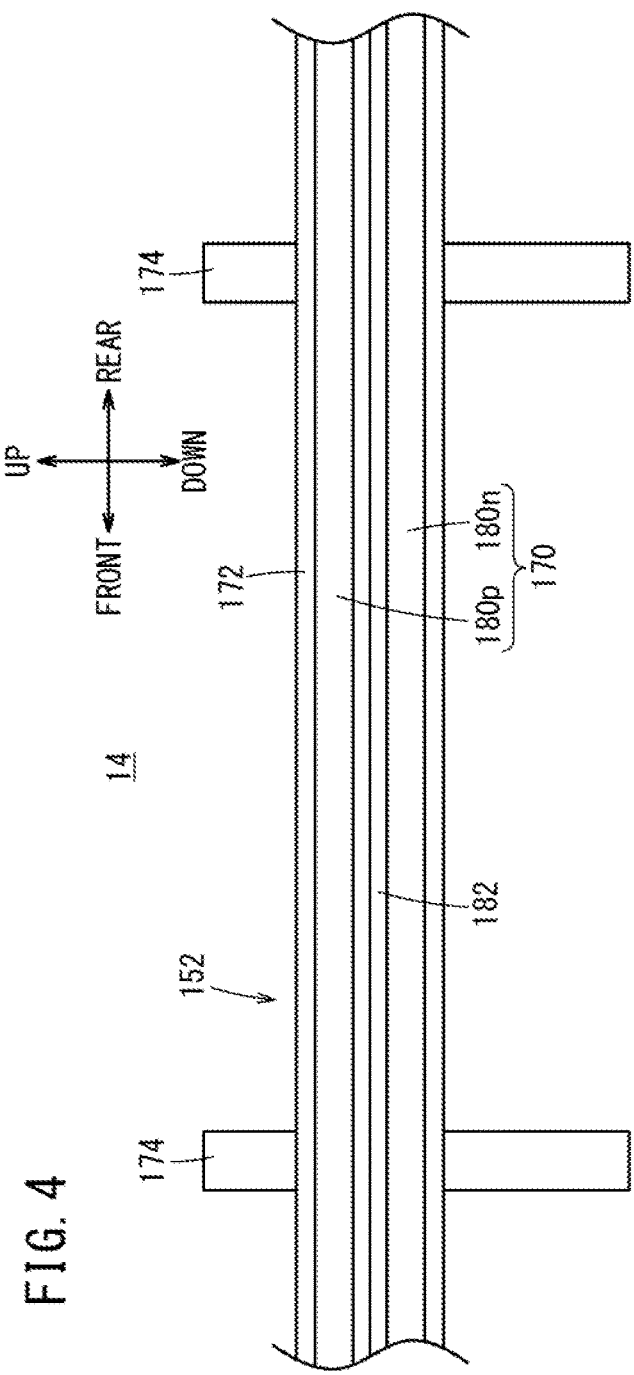
FIG. 4 is an external view showing schematically a portion of an external power supplying apparatus in the first embodiment.

FIG. 4 is an external view showing schematically a portion of the external power supplying apparatus 14. As shown in FIGS. 1 through 4, the power supplying apparatus 14 includes a DC power source 150, a contact-type power supplying portion 152, a DC/DC converter 154 (hereinafter also referred to as a "converter 154" or an "external converter 154"), a diode 156, a voltage sensor 158, an input device 160, and a control device 162. Hereinafter, the DC power source 150, the converter 154, the diode 156, the voltage sensor 158, the input device 160, and the control device 162 may also be referred to collectively as a voltage applying unit 164. The voltage applying unit 164 is a site that applies a voltage with respect to the contact-type power supplying portion 152.

(1A-3-1. DC Power Source 150)

The DC power source 150 (hereinafter also referred to as a "power source 150") supplies electrical power with respect to the vehicle 12. The power source 150 of the present embodiment is constituted, for example, by connecting a plurality of batteries together in series. Alternatively, the power source 150 may be constituted from a single battery. Alternatively, the power source 150 can be constituted from a combination of a commercial AC power source and an AC/DC converter (not shown).

(1A-3-2. Contact-Type Power Supplying Portion 152)

(1A-3-2-1. Overall Configuration of Contact-Type Power-Supplying Portion 152)

The contact-type power supplying portion 152 (hereinafter also referred to as a "power supplying portion 152") is a site, which by being placed in contact with the arm 28 of the vehicle 12, supplies electrical power from the power source 150 to the side of the vehicle 12. As shown in FIGS. 1 through 4, the contact-type power supplying portion 152 of the present embodiment includes external power lines 170, a power line retaining section 172, and a plurality of support posts 174.

(1A-3-2-2. External Power Lines 170)

The external power lines 170 (hereinafter also referred to as "power lines 170") comprise a positive electrode terminal 180p and a negative electrode terminal 180n. As shown in FIGS. 3 and 4, the positive electrode terminal 180p and the negative electrode terminal 180n are formed as a pair in the interior of a groove member 182 that is formed in the power line retaining section 172. Therefore, the external power lines 170 are constituted as aerial power lines that are disposed above a travel path 190 (see FIG. 2 etc.). Further, as shown in FIG. 2, the positive electrode terminal 180p and the negative electrode terminal 180n are arranged along the travel path 190 of the vehicle 12. In particular, the positive electrode terminal 180p and the negative electrode terminal 180n are disposed in the form of a straight line. The length of the positive electrode terminal 180p and the negative electrode terminal 180n in the direction of travel of the vehicle 12 can be set to any value, for example, within a range of 1 to 100 m.

(1A-3-2-3. Power Line Retaining Section 172 and Support Posts 174)

As discussed above, the power line retaining section 172 retains the external power lines 170 in the groove member 182 thereof. The support posts 174 are disposed vertically on the side of the travel path 190, and support the external power lines 170 and the power line retaining section 172.

(1A-3-3. External Converter 154)

The external converter 154 converts the input voltage (power source voltage Vcc) from the power source 150, and outputs the same to the external power lines 170. The converter 154 is a step-up/step-down type converter. Alternatively, depending on the power source voltage Vcc, the converter 154 can be a step-up or a step-down type of converter.

The conversion ratio of the converter 154 is controlled by the control device 162. More specifically, the duty ratio of drive signals Sd2 with respect to the converter 154 is adjusted, whereby the power supply voltage Vs is controlled by converting the power source voltage Vcc. The power source voltage Vcc according to the present embodiment is a comparatively high voltage, and the converter 154 produces the power supply voltage Vs by stepping-down the power source voltage Vcc. Alternatively, the converter 154 may carry out only stepping-up of the power source voltage Vcc, or may carry out both stepping-up and stepping-down in voltage thereof. After the power supply voltage Vs has reached the target value, the control device 162 maintains the power supply voltage Vs at a constant value.

(1A-3-4. Diode 156)

The diode 156 is arranged between the converter 154 and the positive electrode terminal 180$p$, and serves to prevent flowing of current from the vehicle 12 to the side of the power supplying apparatus 14.

(1A-3-5. Voltage Sensor 158)

The voltage sensor 158 is disposed on a secondary side (output side) of the DC/DC converter 154, detects the output voltage VS of the converter 154, and outputs information thereof to the control device 162.

(1A-3-6. Input Device 160)

The input device 160 serves to input to the control device 162 commands from an administrator of the power supplying apparatus 14. The input device 160 can be constituted, for example, from a plurality of operation buttons, and an input means such as a keyboard or the like.

(1A-3-7. Control Device 162)

The control device 162 serves to control the power supplying apparatus 14 as a whole, and according to the present embodiment, primarily controls the external converter 154.

1B. Various Types of Control

[1B-1. Overview]

Next, a description will be presented concerning various controls when electrical power is supplied to the vehicle 12 from the power supplying apparatus 14, and charging of the battery 24 of the vehicle 12 is performed. The controls include an energizing arm control, a vehicle body posture control, and a charging control.

The energizing arm control is a control for the energizing arm 28 prior to charging, during charging, and after charging of the battery 24, which is implemented by the arm controller 130 of the ECU 48. The vehicle body posture control serves to control the posture of the vehicle body 52 (vehicle 12) accompanying deployment of the energizing arm 28, and is implemented by the posture controller 132 of the ECU 48. The vehicle body posture control of the first embodiment primarily treats the EPS mechanism 46 as a control object. The charging control is a control for carrying out charging of the battery 24 of the vehicle 12. In the charging control, there are included a power supplying control implemented by the control device 162 of the power supplying apparatus 14, and a power receiving control implemented by the energizing controller 134 of the ECU 48 of the vehicle 12.

According to the first embodiment, by a combination of the energizing arm control and the vehicle body posture control, the contact state between the contact-type power supplying portion 152 of the power supplying apparatus 14 and the power receiving portion 62 of the vehicle 12 can suitably be maintained during the charging control.

[1B-2. Energizing Arm Control]

Figure 5:
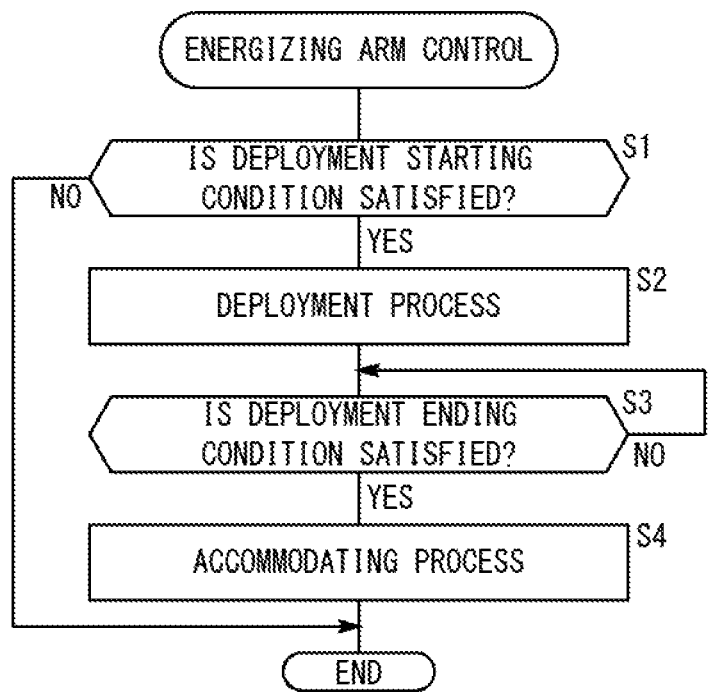
FIG. 5 is a flowchart of an energizing arm control in the first embodiment.

FIG. 5 is a flowchart of the energizing arm control according to the first embodiment. In step S1 of FIG. 5, the ECO 48 determines whether or not a deployment starting condition for the energizing arm 28 has been satisfied. As such a deployment starting condition, there can be cited, for example, that the deployment switch 40 has been turned on.

In addition to or in place thereof, the fact that a distance (distance in the direction of travel) between the vehicle 12 and the contact-type power supplying portion 152 in the direction of travel of the vehicle 12 is less than or equal to a predetermined threshold value (distance threshold value) may serve as a deployment starting condition. In order to determine the distance in the direction of travel, for example, there may be provided beforehand in the vehicle 12 a non-illustrated present position detecting device (for example, a navigation device), and a map database in which position information of the power supplying apparatus 14 (power supplying portion 152) is stored. In addition, the distance in the direction of travel can be calculated as a distance between the present position of the vehicle 12 and the position of the power supplying portion 152.

Alternatively, it is possible to provide communications devices for short-range communications, respectively, in the vehicle 12 and the power supplying apparatus 14, and it can be judged that the deployment starting condition is satisfied when communications between both communications devices are established.

In the case that the deployment starting condition is not satisfied (step S1: NO), then the current process is terminated, and the procedure is started again from step S1 after elapse of a predetermined time period. In the case that the deployment, starting condition is satisfied (step S1: YES), then the routine proceeds to step S2.

In step S2, the ECU 48 implements a deployment process for deploying the arm 28, which is in an accommodated state. Specifically, the ECO 48 moves the slider 90 up to a deployment target position Pinitar. Accordingly, the energizing arm 28 is deployed at a predetermined angular velocity. At this time, in the case that the energizing arm 28 is not in contact with the power supplying portion 152 (external power lines 170), the angle of rotation (arm angle θarm) of the energizing arm 28 reaches an initial deployment target angle θinitar. The initial deployment target angle θinitar is set, for example, to a maximum value of the arm angle θarm. Consequently, the energizing arm 28 approaches the external power lines 170 in a state of projecting out farthest from the vehicle body 52 of the vehicle 12.

In step S3, the ECU 48 determines whether or not a deployment ending condition for the energizing arm 28 has been satisfied. As such a deployment ending condition, there can be cited, for example, that the deployment switch 40 has been turned off.

In addition to or in place thereof, completion of charging of the battery 24 may be used as the deployment-ending condition. Completion of charging can be determined by the SOC having reached a predetermined threshold (SOC threshold).

Alternatively, it is possible to provide communications devices for short-range communications, respectively, in the vehicle 12 and the power supplying apparatus 14, and after communications between both communications devices has been established, it can be judged that, the deployment ending condition is satisfied when communications are cut off.

In the case that the deployment ending condition is satisfied (step S3: YES), then in step S4, the ECU 48 implements an accommodating process for accommodating the energizing arm 28, which is in the deployed condition.

Upon completion of the accommodating process, the procedure is started again from step S1 after elapse of a predetermined time period. If the deployment ending condition has not been satisfied (step S3: NO), then step S3 is repeated.

[1B-3, Vehicle Body Posture Control]
(1B-3-1. Overall Process Flow of Vehicle Body Posture Control)

Figure 6:
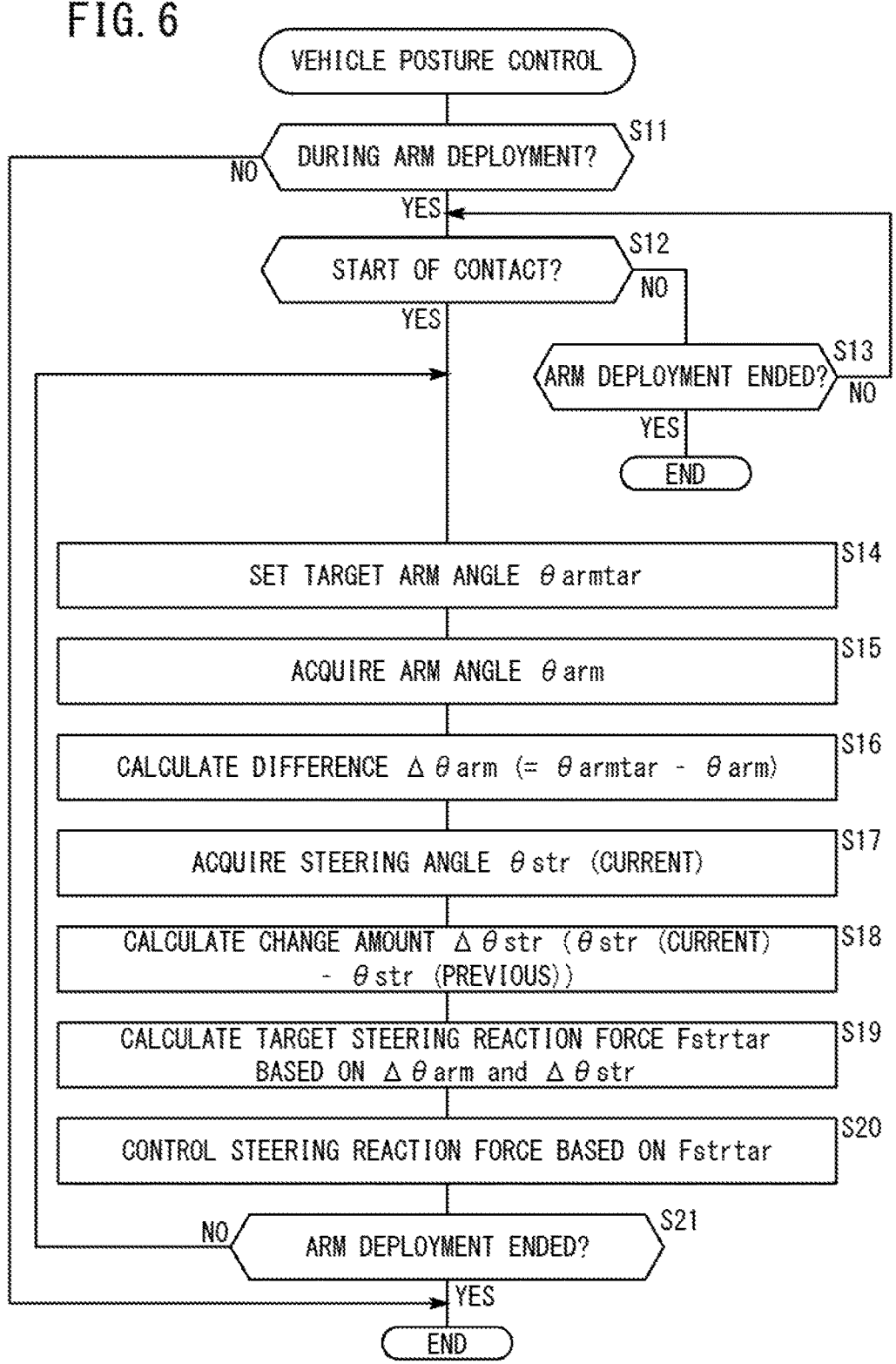
FIG. 6 is a flowchart of a vehicle body posture control in the first embodiment.

FIG. 6 is a flowchart of the vehicle body posture control in the first embodiment. In step S11, the ECU 48 determines whether or not the energizing arm 28 is currently deployed. If the arm 28 is not currently deployed (step S11: NO), the ECU 48 terminates the current process, and the procedure is started again from step S11 after elapse of a predetermined time period. If the arm 28 is currently deployed (step S11: YES), the routine proceeds to step S12.

In step S12, the ECU 48 determines whether or not contact of the arm 28 with the external power lines 170 has started. Such a determination is carried out based on an output from the contact sensor 63. If contact of the arm 28 with the external power lines 170 has not started (step S12: NO), then in step S13, the ECU 48 determines whether or not deployment of the arm 28 has ended. Such a determination is carried out, for example, in accordance with whether or not the deployment switch 40 has been turned off. If deployment of the arm 28 has not been completed (step S13: NO), the routine returns to step S12. If deployment of the arm 28 is completed (step S13: YES), then the current process is terminated, and the procedure is started again from step S11 after elapse of a predetermined time period.

In step S12, in the case that contact between the arm 28 and the power lines 170 is started (step S12: YES), then in step S14, the ECU 48 sets a target value of the arm angle θtar (hereinafter referred to as a "target arm angle θarmtar" or a "target angle θarmtar"). The target angle θarmtar may be either a fixed or a variable value. Subsequently, in step S15, the ECU 48 acquires from the angle sensor 84 an arm angle θarm (detected angle θarm). In step S16, the ECU 48 calculates a difference (hereinafter referred to as a "difference Δθarm") between the target angle θarmtar and the detected angle θarm.

In step S17, the ECU 48 acquires the steering angle θstr from the steering angle sensor 104 through the EPS ECU 106. In step S18, the ECU 48 calculates an amount of change Δθstr [deg/sec] per unit time of the steering angle θstr. The amount of change Δθstr is defined by a difference between a steering angle θstr (current) and a steering angle θstr (previous), and is indicative of a steering direction Dstr of the steering system 100. The parenthetical term "(current)" indicates a value acquired in the current, computation cycle, and the parenthetical term "(previous)" indicates a value acquired in the previous computation cycle.

In step S19, the ECU 48 calculates a target steering reaction force Fstrtar on the basis of the difference Δθarm and the amount of change Δθstr. The method for calculating the target steering reaction force Fstrtar will be described later with reference to FIG. 7.

In step S20, the ECU 48 controls the steering reaction force Fstr on the basis of the target steering reaction force Fstrtar that was calculated in step S19. More specifically, the ECU 48 calculates a target input current (target current Imottar) of the EPS motor 102 based on the target steering reaction force Fstrtar, and controls the input current to the EPS motor 102 responsive to the target current Imottar.

In step S21, the ECO 48 determines whether or not deployment of the arm 28 has ended. Such a determination can be performed in the same way as in step S13.

In addition to or in place thereof, completion of charging of the battery 24 may be used as the deployment ending condition. Completion of charging can be determined by the SOC having reached a predetermined threshold (SOC threshold).

In the case that the deployment ending condition is satisfied (step S21: YES), then the current process is terminated, and the procedure is started again from step S11 after elapse of a predetermined time period. If the deployment ending condition has not been satisfied (step S21: NO), the routine returns to step S14. In the case that a fixed value is used as the target arm angle θarm, then step S15 may be returned to instead of step S14.

(1B-3-2. Calculation of Target Steering Reaction Force Fstrtar)
(1B-3-2-1. Overview)

FIG. 7 is a descriptive view in relation to calculation of the target steering reaction force Fstrtar. As discussed above, the ECU 48 calculates the target steering reaction force Fstrtar on the basis of the difference Δθarm and the amount of change Δθstr (step S19 of FIG. 6). More specifically, on the basis of the difference Δθarm, the ECU 48 determines the positional relationship of the vehicle 12 with respect to the external power lines 170. Further, on the basis of the amount of change Δθstr, the ECU 48 determines the steering direction Dstr of the steering system 100. In addition, the ECU 48 sets the target reaction force Fstrtar based on the results of these determinations.

(1B-3-2-2. Case in which Vehicle 12 Approaches Too Closely with Respect to Power Lines 170)

In the case that the detection angle θarm is less than the target angle θarmtar (θarm<θarmtar) and the difference Δθarm is a positive value (Δθarm>0), it can be determined that the vehicle 12 is too close to the external power lines 170.

In this case, if the steering direction Dstr of the steering system 100 is a direction to make the vehicle 12 approach with respect to the external power lines 170, the ECU 48 increases the target reaction force Fstrtar. Further, if the steering direction Dstr is a direction to make the vehicle 12 move away with respect to the external power lines 170, the ECU 48 decreases the target reaction force Fstrtar. Furthermore, if the amount of change Δθstr is zero and the steering angle θstr is maintained, the ECU 48 places the size of the target reaction force Fstrtar at a medium value. By setting the target reaction force Fstrtar in this manner, the steering of the steering system 100 can be guided so as to cause the vehicle 12 to move away from the external power lines 170 (or stated otherwise, so that the detection angle θarm approaches the target angle θarmtar).

(1B-3-2-3. Case in Which Vehicle 12 is too far with Respect to Power Lines 170)

In the case that the detection angle θarm is greater than the target angle θarmtar (θarm>θarmtar) and the difference Δθarm is a negative value (Δθarm<0), the ECU 48 can determine that the vehicle 12 is too far away with respect to the external power lines 170.

In this case, if the steering direction Dstr is a direction to make the vehicle 12 approach with respect to the external power lines 170, the ECU 48 decreases the target reaction force Fstrtar. Further, if the steering direction Dstr is a direction to make the vehicle 12 move away with respect to the external power lines 170, the ECU 48 increases the target reaction force Fstrtar. Furthermore, if the amount of change Δθstr is zero and the steering angle θstr is maintained, the ECU 48 places the size of the target reaction force Fstrtar at a medium value. By setting the target reaction force Fstrtar in this manner, the steering of the steering system 100 can be guided so as to cause the vehicle 12 to approach the external power lines 170 (or stated otherwise, so that the detection angle θarm approaches the target angle θarmtar).

(1B-3-2-4. Case in Which Distance Ls Between Vehicle 12 and External Power Lines 170 is Appropriate)

In the case that the detection angle θarm is equivalent, to the target angle θarmtar (θarm=θarmtar) and the difference Δθarm is zero (Δθarm=0), it can be determined that the distance Ls (see FIG. 2) between the vehicle 12 and the external power lines 170 is appropriate.

In this case, if the steering direction Dstr is a direction to make the vehicle 12 move closer or move away with respect to the external power lines 170, the ECU 48 increases the target reaction force Fstrtar. Further, if the amount of change Δθstr is zero and the steering angle θstr is maintained, the ECU 48 decreases the target, reaction force Fstrtar. By setting the target, reaction force Fstrtar in this manner, the steering of the steering system 100 can be guided so as to maintain the distance Ls between the vehicle 12 and the external power lines 170 (more specifically, so that a state is maintained in which the detection angle θarm coincides with or approximates the target angle θarmtar).

[1B-4. Power Supplying Control of Power Supplying Apparatus 14]

The control device 162 of the external power supplying apparatus 14 places the external power lines 170 in a power-supplying capable state, on the basis of a command from an administrator that is input through the input device 160. More specifically, the control device 162 outputs drive signals Sd2 (see FIG. 1) intermittently or continuously to the switching element, (not shown) of the external converter 154, thereby connecting the power source 150 and the power lines 170. Consequently, the power lines 170 are placed in a power supply enabling state. In addition, when the power receiving portion 62 of the arm 28 comes into contact with the power lines 170, supply of power from the power supplying apparatus 14 to the vehicle 12 is carried out through the power lines 170.

[1B-5. Power Receiving Control of Vehicle 12]

The power receiving control is carried out when the arm 28 is deployed. For example, the ECU 48 initiates the power receiving control with pressing of the deployment switch 40 being treated as a triggering event.

In the power receiving control, the ECU 48 sets a target value or a limiting value in relation to at least, one of the input current, the input voltage, and the input power to the battery 24 or the like. In addition, the ECU 48 controls the DC/DC converter 30 on the basis of the target value or the limiting value. The power receiving control can be performed in the same manner as the control with respect, to a first DC/DC converter 31 of Japanese Laid-Open Patent Publication No. 2013-208008 (refer to FIGS. 4 through 6 of the same publication).

1C. Advantages of the First Embodiment

According to the first embodiment, at the time that the energizing head 60 (free end) of the energizing arm 28 comes into contact with the external power lines 170, the posture of the vehicle body 52 is controlled so that the angle of rotation θarm of the energizing arm 28 approaches the target angle of rotation θarmtar (steps S19, S20 of FIG. 6, and FIG. 7). Consequently, contact of the energizing arm 28 with respect to the external power lines 170 can be made stable.

More specifically, in the case that the energizing head 60 is placed in contact with the external power lines 170 during traveling of the electric vehicle 12, there is a concern that the contact state may become unstable accompanying changes (including movement) of the posture of the vehicle body 52 caused by traveling of the vehicle 12. If the contact state becomes unstable, alternating states may occur between contact and non-contact, and there is a possibility that trouble will be caused, such as generation of arcing between the energizing head 60 and the external power lines 170. According to the present invention, it is possible for such a defect to be prevented.

In the present embodiment, the vehicle 12 is equipped with the EPS mechanism 46 (see FIG. 1). The EPS mechanism 46 comprises the steering system 100, the EPS motor 102 (steering reaction force imposing device) that applies the reaction force Fr to the steering system 100, and the EPS ECU 106 (steering reaction force control device) that controls the EPS motor 102. In the event it is determined that the angle of rotation θarm coincides with the target angle of rotation θarmtar, the EPS ECU 106 generates the steering reaction force Fstr in the EPS motor 102 so as to suppress a change in the steering angle θstr (steps S19, S20 of FIG. 6, and FIG. 7). Further, in the event it is determined that the angle of rotation θarm does not coincide with the target angle of rotation θarmtar, the EPS ECU 106 generates the steering reaction force Fstr in the EPS motor 102 so as to cause the angle of rotation θarm to approach the target angle of rotation θarmtar (steps S19, S20 of FIG. 6, and FIG. 7).

In accordance with this feature, the steering operation of the driver can be guided so as to maintain the contact state between the energizing head 60 and the external power lines 170.

II. Second Embodiment

2A. Configuration (Differences from First Embodiment)

Figure 8:
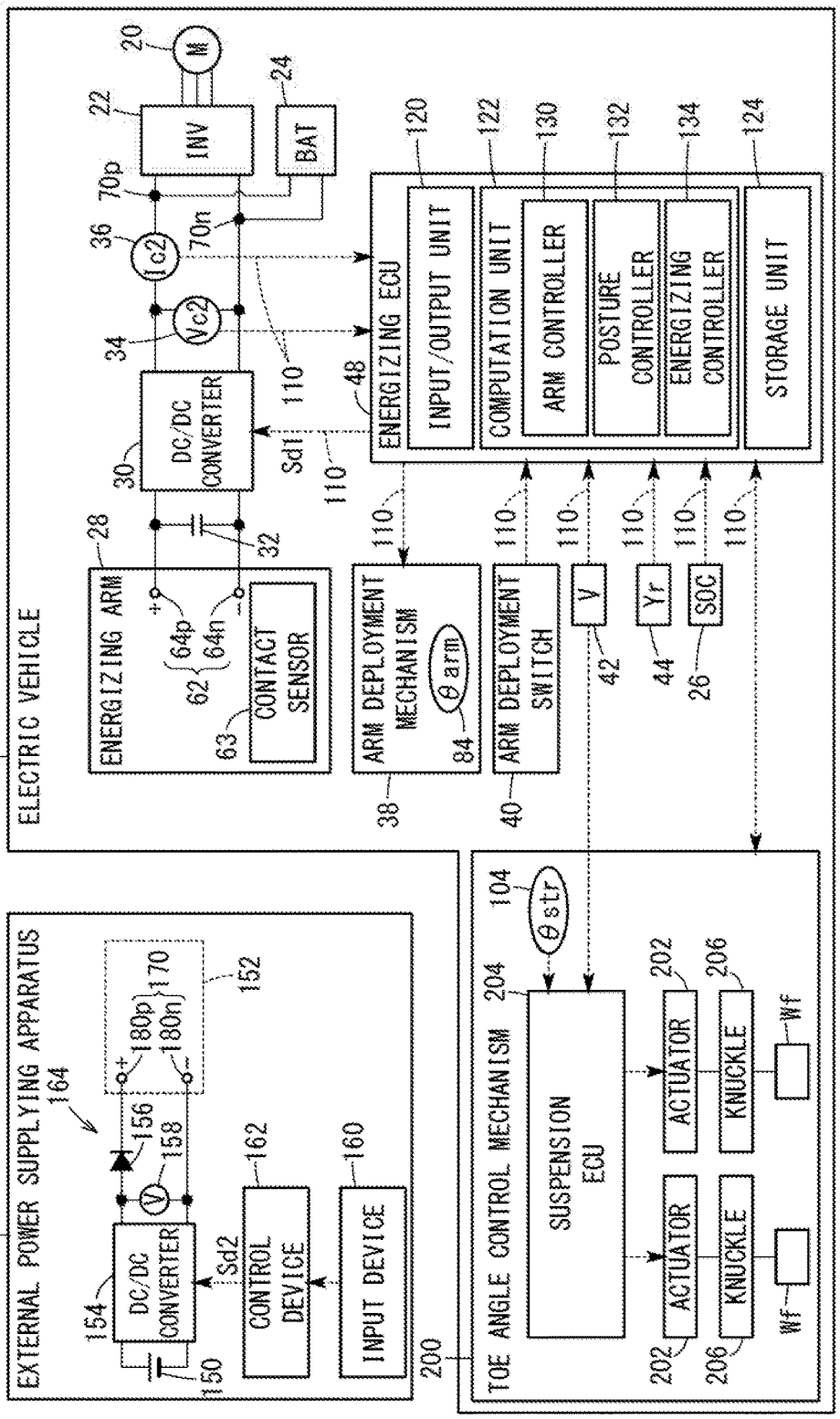
FIG. 8 is an outline schematic view of a charging system equipped with an electric vehicle according to a second embodiment of the present invention.

FIG. 8 is an outline schematic view of a charging system 10A equipped with an electric vehicle 12a according to a second embodiment of the present invention. In the same manner as the first embodiment, according to the second embodiment, electrical power is supplied to the electric vehicle 12a (hereinafter also referred to as a "vehicle 12a") from the power supplying apparatus 14, and charging of the battery 24 for traveling of the vehicle 12a is performed. Below, constituent elements which are the same as those of the first embodiment will be denoted with the same reference characters, and description of such features is omitted. Further, the external power supplying apparatus 14 of the second embodiment is the same as that of the first embodiment.

The vehicle 12a of the second embodiment includes a toe angle control mechanism 200 that, controls a toe angle θt of the front wheels Wf as steered wheels. As shown in FIG. 8, in addition to the steering angle sensor 104, which is the same as that of the first embodiment, the toe angle control mechanism 200 includes toe angle control actuators 202 (hereinafter also referred to as "actuators 202"), and a suspension electronic control unit 204 (hereinafter referred to as a "suspension ECU 204" or an "ECU 204").

The actuators 202 serve to displace knuckles 206 of the front wheels Wf, and for example, are constituted as electromagnetic or pneumatic types of linear actuators. The suspension ECU 204, for example, adjusts the toe angle θt of the front wheels Wf by controlling the actuators 202 on the basis of the vehicle velocity V and the steering angle θstr. Concerning the detailed structure of the toe angle control mechanism 200, for example, the configuration disclosed in Japanese Laid-Open Patent Publication No. 2010-241294 can be used.

2B. Various Types of Control

[2B-1. Overview (Differences from First Embodiment)]

In the second embodiment, the vehicle body posture control differs from that of the first embodiment. More specifically, with the vehicle body posture control of the first embodiment (see FIG. 6), using the EPS mechanism 46 (or stated otherwise, by performing a so-called steering assist), the posture of the vehicle body 52 is controlled. In contrast thereto, the vehicle body posture control of the second embodiment controls the posture of the vehicle body 52 using the toe angle control mechanism 200.

[2B-2. Vehicle Posture Stabilizing Control]

FIG. 9 is a flowchart of a vehicle body posture control in the second embodiment. Steps S31 to S36 and S39 of FIG. 9 are the same as steps S11 to S16 and S21 of FIG. 6. In steps S37 and S38, the ECU 48 carries out a control using the toe angle control mechanism 200.

More specifically, in step S37, the ECU 48 calculates a correction amount, for the toe angle $\theta t$ (hereinafter referred to as a "toe angle correction amount $\Delta\theta tc$" or a "correction amount $\Delta\theta tc$") on the basis of the difference $\Delta\theta arm$ (=target arm angle $\theta armtar$—arm angle $\theta arm$).

FIG. 10 is a descriptive view in relation to correction of the toe angle $\theta t$. In the case that the detection angle $\theta arm$ is less than the target angle $\theta armtar$ ($\theta arm<\theta armtar$) and the difference $\Delta\theta arm$ is a positive value ($\Delta\theta arm>0$), it can be determined that the vehicle 12a is too close to the external power lines 170. In this case, the ECO 48 calculates the correction amount $\Delta\theta tc$ so that the vehicle 12a (energizing head 60) moves away from the power lines 170. In the present embodiment, the energizing arm 28 is disposed on a right side portion of the vehicle body 52 (see FIG. 2). Therefore, in order that the vehicle 12a (energizing head 60) moves away from the power lines 170, the toe angle correction amount $\Delta\theta tc$ is calculated so that the front, wheels Wf are turned more to the left (counterclockwise as viewed in plan).

Further, in the case that the detection angle $\theta arm$ is greater than the target angle $\theta armtar$ ($\theta arm>\theta armtar$) and the difference $\Delta\theta arm$ is a negative value ($\Delta\theta arm<0$), it can be determined that the vehicle 12a is too far away from the external power lines 170. In this case, the ECU 48 calculates the correction amount. $\Delta\theta tc$ so that the vehicle 12a moves closer to the power lines 170. More specifically, the toe angle correction amount. $\Delta\theta tc$ is calculated so that the front wheels Wf are turned more to the right (clockwise as viewed in plan).

Furthermore, in the case that the detection angle $\theta arm$ is equivalent, to the target angle $\theta armtar$ ($\theta arm=\theta armtar$) and the difference $\Delta\theta arm$ is zero ($\Delta\theta arm=0$), it can be determined that the distance Ls between the vehicle 12a and the external power lines 170 is appropriate. In this case, the ECU 48 sets the correction amount $\Delta\theta tc$ to zero, and the toe angle $\theta t$ is not corrected.

2C. Advantages of Second Embodiment

As described above, according to the second embodiment, in addition to or in place of the advantages of the first embodiment, the following advantageous effects can be offered.

More specifically, in the second embodiment, the electric vehicle 12a is equipped with the toe angle control actuators 202 that control the toe angle $\theta t$ of the front wheels Wf (steered wheels) and the suspension ECU 204 (toe angle control device) that controls the toe angle control actuators 202. In the case it is determined that the angle of rotation $\theta arm$ coincides with the target angle of rotation $\theta armtar$, the ECU 204 controls the toe angle actuators 202 so as to suppress a change in the toe angle $\theta t$ of the front wheels Wf (steps S37, S38 of FIG. 9, and FIG. 10). Further, in the case it is determined that the angle of rotation $\theta arm$ does not coincide with the target angle of rotation $\theta armtar$, the ECU 204 controls the toe angle actuators 202 so that the angle of rotation $\theta arm$ approaches the target angle of rotation $\theta armtar$ (steps S37, S38 of FIG. 9, and FIG. 10).

In accordance therewith, the toe angle $\theta t$ of the front wheels Wf can be adjusted automatically so as to maintain the contact state between the energizing head 60 (free end) of the energizing arm 28 and the external power lines 170.

III. Third Embodiment

3A. Configuration (Differences from First Embodiment)

Figure 11:
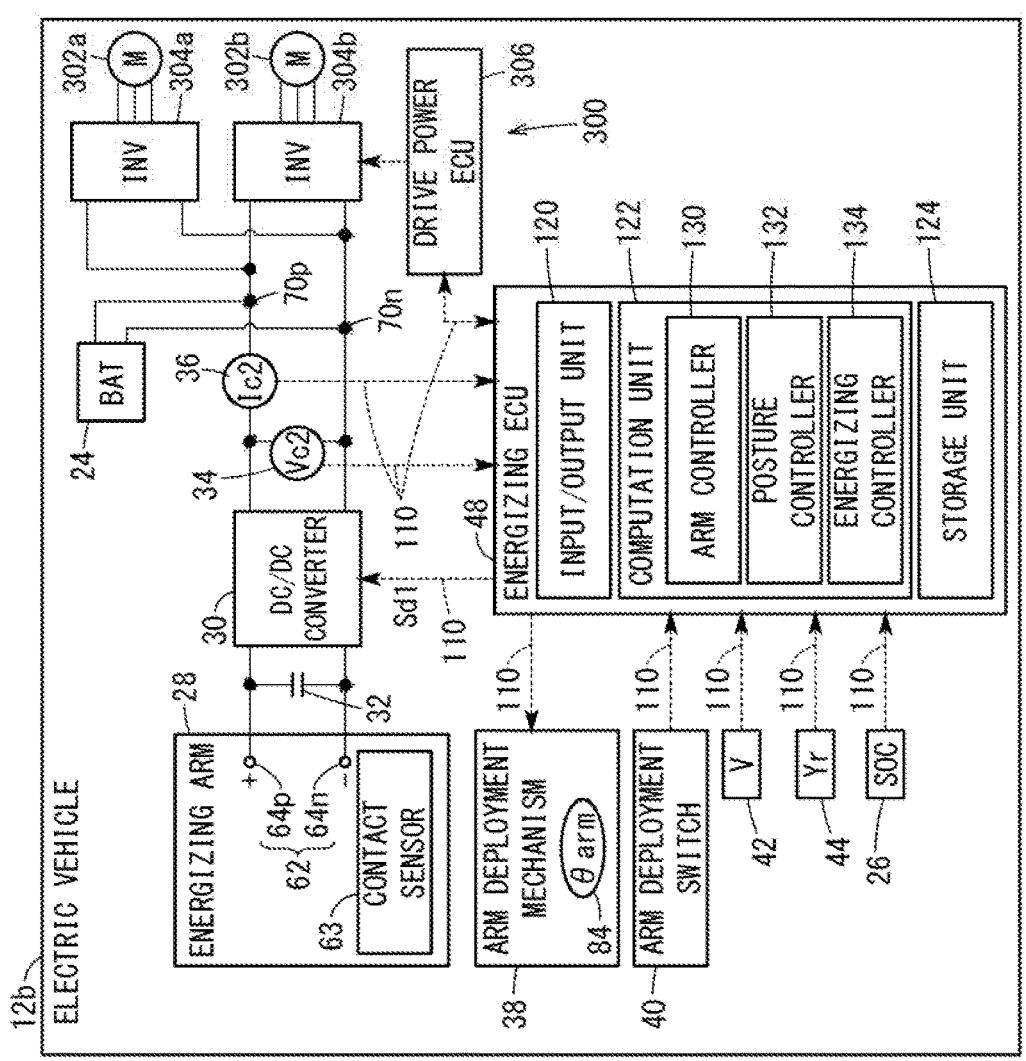
FIG. 11 is an outline schematic view of a charging system equipped with an electric vehicle according to a third embodiment of the present, invention.

FIG. 11 is an outline schematic view of a charging system 10B equipped with an electric vehicle 12b according to a third embodiment of the present invention. In the same manner as the first and second embodiments, according to the third embodiment, electrical power is supplied to the electric vehicle 12b (hereinafter also referred to as a "vehicle 12b") from the power supplying apparatus 14, and charging of the battery 24 for traveling of the vehicle 12b is performed. Below, the same constituent elements are denoted with the same reference characters, and description of such features is omitted. Further, the external power supplying apparatus 14 of the third embodiment is the same as that of the first and second embodiments.

The vehicle 12b of the third embodiment is equipped with a drive power distribution adjusting mechanism 300 (hereinafter also referred to as an "adjusting mechanism 300") that adjusts a drive power distribution of the left and right rear wheels Wr as drive wheels. The adjusting mechanism 300 includes two traction motors 302a, 302b, two inverters 304a, 304b, and a drive electronic control unit 306 (hereinafter referred to as a "drive ECU 306"). Below, the traction motors 302a, 302b may also be referred to as "motors 302a, 302b" and collectively as "motors 302". Further, the motor 302a may also be referred to as a left motor 302a, whereas the motor 302b may also be referred to as a right motor 302b. The left motor 302a is connected to the left rear wheel Wr through a non-illustrated left side transmission. The right motor 302b is connected to the right rear wheel Wr through a non-illustrated right side transmission.

The drive ECU 306 controls drive powers or driving forces of the motors 302a, 302b on the basis of an operation amount of a non-illustrated accelerator pedal. Furthermore, the drive ECU 306 controls the posture of the vehicle body 52 using a drive power distribution (left/right distribution) of the motors 302a, 302b. Moreover, in addition to the motors 302a, 302b, the vehicle 12b may be equipped with at least one of an engine and a front wheel motor.

3B. Various Types of Control

[3B-1. Overview (Differences from First Embodiment)]

In the third embodiment, the vehicle body posture control differs from that of the first and second embodiments. For example, with the vehicle body posture control of the first embodiment (see FIG. 6), using the EPS mechanism 46 (or stated otherwise, by performing a so-called steering assist), the posture of the vehicle body 52 is controlled. In contrast thereto, the vehicle body posture control of the third embodiment controls the posture of the vehicle body 52 using the drive power distribution (left/right distribution) of the motors 302a, 302b.

[3B-2. Vehicle Posture Stabilizing Control]

Figure 12:
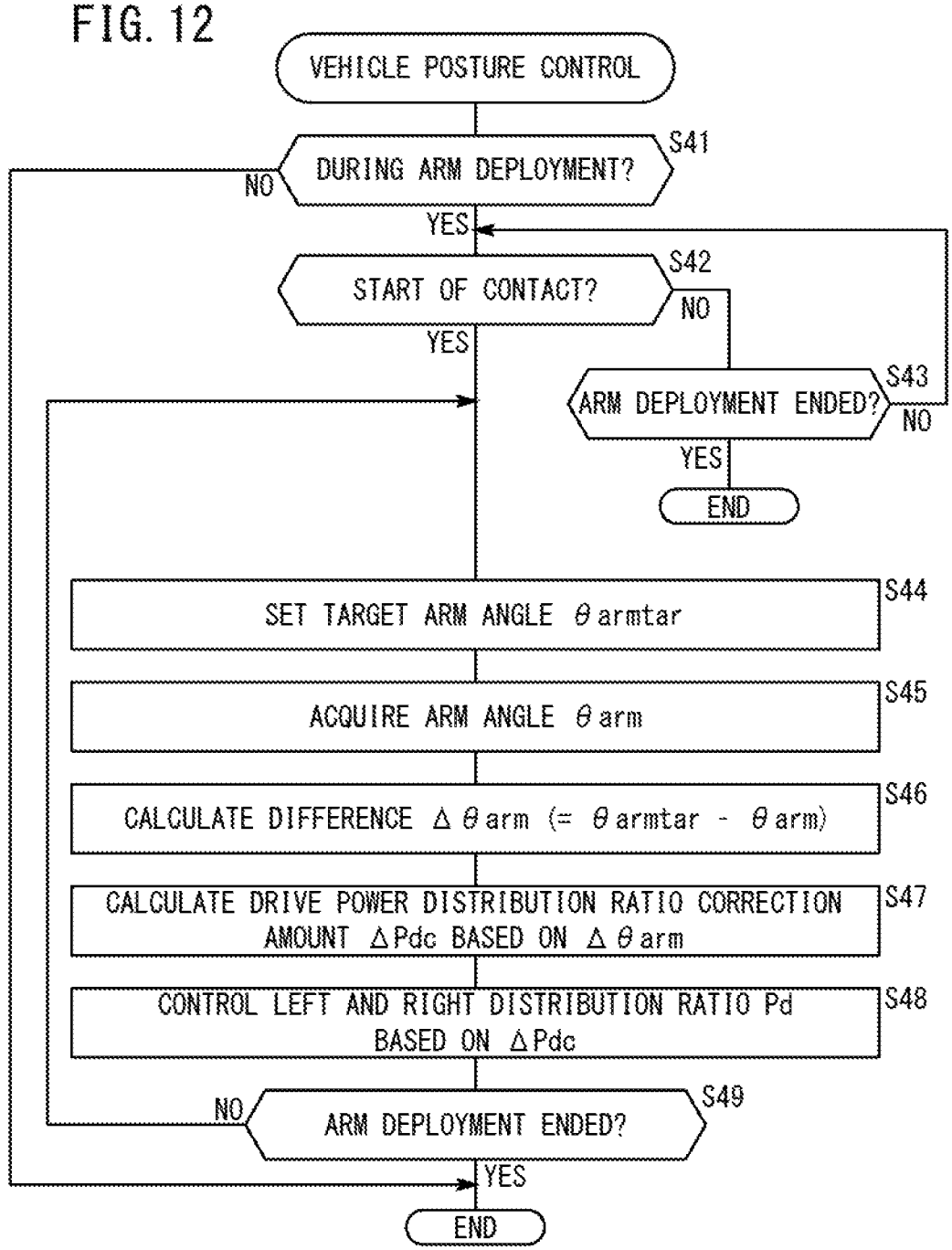
FIG. 12 is a flowchart of a vehicle body posture control in the third embodiment.

FIG. 12 is a flowchart of a vehicle body posture control in the third embodiment. Steps S41 to S46 and S49 of FIG. 12 are the same as steps S11 to S16 and S21 of FIG. 6. In steps S47 and S48, the ECU 48 carries out a control using the drive power distribution of the motors 302a, 302b.

More specifically, in step S47, the ECU 48 calculates a correction amount (hereinafter referred to as a "drive power distribution ratio correction amount ΔPdc" or a "correction amount ΔPdc") for a drive power distribution ratio Pd (hereinafter also referred to as a "distribution ratio Pd") on the basis of the difference Δθarm (=target arm angle θarmtar−arm angle θarm). The distribution ratio Pd is a ratio, of the drive power of the left motor 302a and the drive power of the right motor 302b. Instead of using the distribution ratio Pd, a difference (drive power distribution difference) between the drive power of the left motor 302a and the drive power of the right, motor 302b may also be used.

FIG. 13 is a descriptive view in relation to correction of the drive power distribution ratio Pd. In the case that the detection angle θarm is less than the target angle θarmtar (θarm<θarmtar) and the difference Δθarm is a positive value (Δθarm>0), it can be determined that the vehicle 12b is too close to the external power lines 170. In this case, the ECU 48 calculates the correction amount ΔPdc so that the vehicle 12b (energizing head 60) moves away from the power lines 170. In the present embodiment, the energizing arm 28 is disposed on a right side portion of the vehicle body 52 (see FIG. 2). Therefore, in order that the vehicle 12b (energizing head 60) moves away from the power lines 170, the correction amount ΔPdc is calculated so that the drive power of the right rear wheel Wr is relatively larger with respect to the drive power of the left rear wheel Wr.

Further, in the case that the detection angle θarm is greater than the target angle θarmtar (θarm>θarmtar) and the difference Δθarm is a negative value (Δθarm<0), it can be determined that the vehicle 12b is too far away from the external power lines 170. In this case, the ECU 48 calculates the correction amount ΔPdc so that the vehicle 12b moves closer to the power lines 170. More specifically, the correction amount ΔPdc is calculated so that the drive power of the left rear wheel Wr is relatively larger with respect to the drive power of the right rear wheel Wr.

Furthermore, in the case that the detection angle θarm is equivalent to the target angle θarmtar (θarm=θarmtar) and the difference Δθarm is zero (Δθarm=0), it can be determined that the distance Ls between the vehicle 12b and the power lines 170 is appropriate. In this case, the ECU 48 sets the correction amount ΔPdc to zero, and the distribution ratio Pd is not corrected.

3C. Advantages of the Third Embodiment

As described above, according to the third embodiment, in addition to or in place of the advantages of the first and second embodiments, the following advantageous effects can be offered.

More specifically, in the third embodiment, the vehicle 12b is equipped with the drive power distribution adjusting mechanism 300 that adjusts the drive power distribution of the left and right rear wheels Wr (left and right drive wheels) (see FIG. 11). In the event it is determined that the angle of rotation θarm coincides with the target angle of rotation θarmtar, the adjusting mechanism 300 maintains the drive power distribution ratio Pd (drive power distribution) (steps S47, S48 of FIG. 12, and FIG. 13). Further, in the event it is determined that the angle of rotation θarm does not coincide with the target angle of rotation θarmtar, the adjusting mechanism 300 changes the drive power distribution ratio Pd so as to cause the angle of rotation θarm to approach the target angle of rotation θarmtar (steps S47, S48 of FIG. 12, and FIG. 13).

In accordance with this feature, the drive power distribution of the left and right rear wheels Wr can be adjusted automatically so as to maintain the contact state between the energizing head 60 (free end) of the energizing arm 28 and the external power lines 170.

IV. Fourth Embodiment

4A. Configuration (Differences from First Embodiment)

Figure 14:
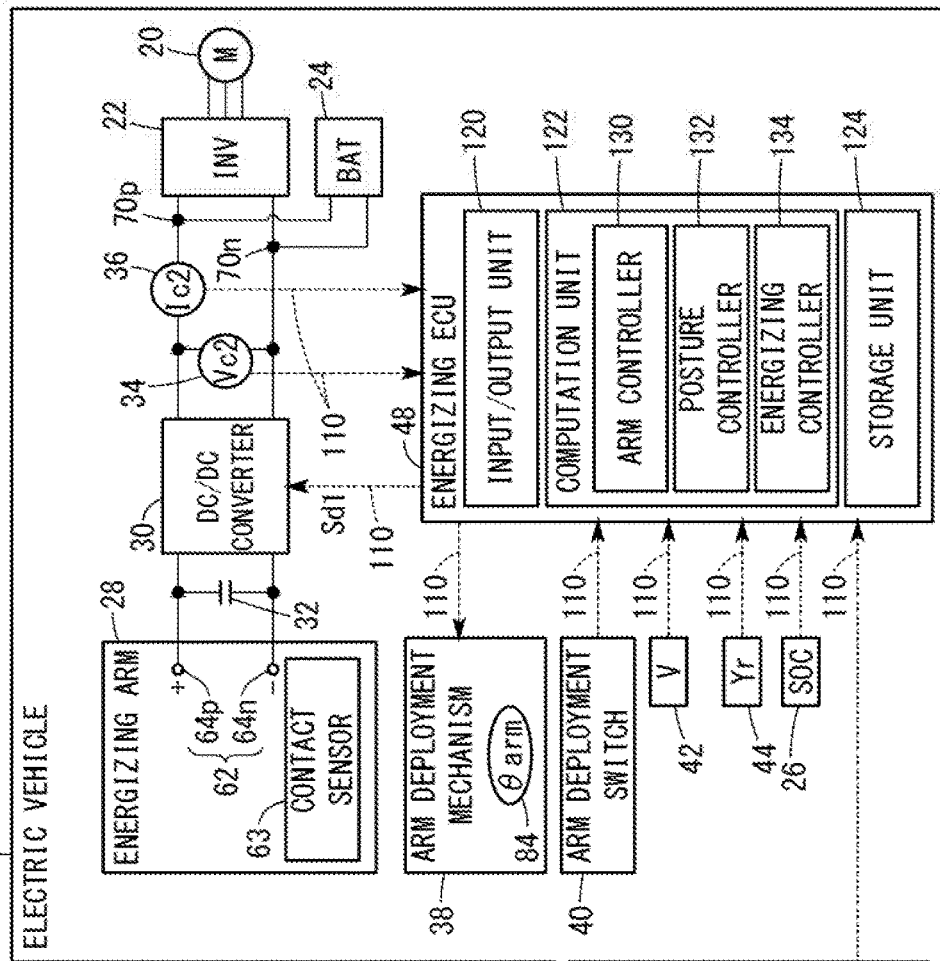
FIG. 14 is an outline schematic view of a charging system equipped with an electric vehicle according to a fourth embodiment of the present invention.

FIG. 14 is an outline schematic view of a charging system 10C equipped with an electric vehicle 12c according to a fourth embodiment of the present invention. In the same manner as the first through third embodiments, according to the fourth embodiment, electrical power is supplied to the electric vehicle 12c (hereinafter also referred to as a "vehicle 12c") from the power supplying apparatus 14, and charging etc. of the battery 24 (see FIG. 1) for traveling of the vehicle 12c is performed. Below, the same constituent, elements are denoted with the same reference characters, and description of such features is omitted. Further, the external power supplying apparatus 14 of the fourth embodiment is the same as that of the first, through third embodiments.

The vehicle 12c of the fourth embodiment is equipped with a brake mechanism 400 (braking force distribution adjusting mechanism) that adjusts a braking force distribution of the left and right wheels (in this case, the left and right rear wheels Wr). The brake mechanism 400 includes two rear wheel brakes 402a, 402b, and a brake electronic control unit 404 (hereinafter referred to as a "brake ECU 404"). The brake 402a is used with the left rear wheel Wr, and will also be referred to as a left brake 402a below. The brake 402b is used with the right rear wheel Wr, and will also be referred to as a right brake 402b below. Furthermore, below, the brakes 402a, 402b may be referred to collectively as "brakes 402".

The brake ECO 404 controls the braking forces of the brakes 402a, 402b based on an operation amount of a non-illustrated brake pedal, and a distance from a preceding vehicle, etc. Furthermore, the brake ECU 404 controls the posture of the vehicle body 52 using a braking force distribution (left/right distribution) of the brakes 402a, 402b. Moreover, assuming that the left and right braking force distribution is capable of being changed, the control object of the brake ECU 404 may be the front wheel brakes (not shown) in addition to or in place of the rear wheel brakes 402a, 402b.

4B. Various Types of Control

[4B-1. Overview (Differences from First Embodiment)]

In the fourth embodiment, the vehicle body posture control differs from that of the first through third embodiments. For example, with the vehicle body posture control of the first embodiment (see FIG. 6), using the EPS mechanism 46 (or stated otherwise, by performing a so-called steering assist), the posture of the vehicle body 52 is controlled. In contrast thereto, the vehicle body posture control of the fourth embodiment controls the posture of the vehicle body 52 using the braking force distribution (left/right distribution) of the brakes 402a, 402b.

[4B-2. Vehicle Posture Stabilizing Control]

FIG. 15 is a flowchart of a vehicle body posture control in the fourth embodiment. Steps S51 to S56 and S59 of FIG. 15 are the same as steps S11 to S16 and S21 of FIG. 6. In steps S57 and S58, the ECU 48 carries out a control using the braking force distribution of the brakes 402a, 402b.

More specifically, in step S57, the ECU 48 calculates a correction amount, (hereinafter referred to as a "braking force distribution ratio correction amount ΔPbc" or a "correction amount ΔPbc") for a braking force distribution ratio Pb (hereinafter also referred to as a "distribution ratio Pb") on the basis of the difference Δθarm (=target arm angle θarmtar—arm angle θarm). The distribution ratio Pb is a ratio of the braking force of the left brake 402a and the braking force of the right brake 402b. Instead of using the distribution ratio Pb, a difference (braking force distribution difference) between the braking force of the left brake 402a and the braking force of the right, brake 402b may also be used.

FIG. 16 is a descriptive view in relation to correction of the braking force distribution ratio Pb. In the case that the detection angle θarm is less than the target angle θarmtar (θarm<θarmtar) and the difference Δθarm is a positive value (Δθarm>0), it can be determined that the vehicle 12c is too close to the external power lines 170. In this case, the ECU 48 calculates the correction amount ΔPbc so that the vehicle 12c (energizing head 60) moves away from the power lines 170. In the present embodiment, the energizing arm 28 is disposed on a right side portion of the vehicle body 52 (see FIG. 2). Therefore, in order that the vehicle 12c (energizing head 60) moves away from the power lines 170, the correction amount ΔPbc is calculated so that the braking force of the left rear wheel Wr is relatively larger with respect to the braking force of the right rear wheel Wr.

Further, in the case that the detection angle θarm is greater than the target angle θarmtar (θarm>θarmtar) and the difference Maim is a negative value (Δθarm<0), it can be determined that the vehicle 12c is too far away from the external power lines 170. In this case, the ECU 48 calculates the correction amount ΔPbc so that the vehicle 12c moves closer to the power lines 170. More specifically, the correction amount ΔPbc is calculated so that the braking force of the right rear wheel Wr is relatively larger with respect to the braking force of the left rear wheel Wr.

Furthermore, in the case that the detection angle θarm is equivalent to the target angle θarmtar (θarm=θarmtar) and the difference Δθarm is zero (Δθ=0), it can be determined that the distance Ls between the vehicle 12c and the power lines 170 is appropriate. In this case, the ECU 48 sets the correction amount ΔPbc to zero, and the distribution ratio Pb is not corrected.

4C. Advantages of the Fourth Embodiment

As described above, according to the fourth embodiment, in addition to or in place of the advantages of the first through third embodiments, the following advantageous effects can be offered.

More specifically, in the fourth embodiment, the vehicle 12c is equipped with the brake mechanism 400 (braking force distribution adjusting mechanism) that adjusts a braking force distribution of the left and right-rear wheels Wr (see FIG. 14). In the event it is determined that the angle of rotation θarm coincides with the target angle of rotation θarmtar, the brake mechanism 400 maintains the braking force distribution (steps S57, S58 of FIG. 15, and FIG. 16). Further, in the event it is determined that the angle of rotation θarm does not coincide with the target angle of rotation θarmtar, the brake mechanism 400 changes the braking force distribution ratio Pb (braking force distribution) so as to cause the angle of rotation θarm to approach the target angle of rotation θarmtar (steps S57, S58 of FIG. 15, and FIG. 16).

In accordance with this feature, the braking force distribution of the left and right rear wheels Wr can be adjusted automatically so as to maintain the contact state between the energizing head 60 (free end) of the energizing arm 28 and the external power lines 170.

V. Modifications

The present invention is not limited to the above-described embodiments, and it goes without saying that various configurations could be adopted therein, based on the content disclosed in the present specification. For example, the following configurations can be adopted.

5A. Vehicles 12 and 12a to 12c

[5A-1. Types of Vehicles 12 and 12a to 12c]

According to each of the above-described embodiments, each of the vehicles 12, 12a to 12c in the form of a four-wheeled vehicle has been described (see FIG. 2). However, for example, from the standpoint of controlling the posture of the vehicle body 52, it is possible for the present invention to be applied to other vehicles apart, from a four-wheeled vehicle. For example, the vehicles 12, 12a to 12c can be any of a two-wheeled vehicle, a three-wheeled vehicle, and a six-wheeled vehicle. Alternatively, the present invention can be applied to mobile objects (e.g., ships) other than the vehicles 12, 12a to 12c.

According to the first, second, and fourth embodiments, each of the vehicles 12, 12a, 12c is assumed to be a so-called electric automobile (battery vehicle) having only the traction motor 20 as a drive source (see FIGS. 1, 3, and 14). However, for example, from the standpoint of controlling the posture of the vehicle body 52, the vehicles 12, 12a, 12c may be a vehicle other than an electrically powered automobile. For example, the vehicles 12, 12a, 12c may be a hybrid vehicle or a fuel cell vehicle. The same feature applies to the vehicle 12b of the third embodiment.

Each of the vehicles 12, 12a, 12c of the first, second, and fourth embodiments includes a single traction motor 20 (see FIGS. 1, 8, and 14), and the vehicle 12b of the third embodiment includes two traction motors 302a, 302b (see FIG. 11). However, for example, from the standpoint of controlling the posture of the vehicle body 52, three or more traction motors may be included. For example, a single traction motor can be arranged on the side of the front, wheels, and two traction motors can be arranged on the side of the rear wheels.

[5A-2. Circuit Configuration]

In each of the above-described embodiments, the electrical circuit configuration of each of the vehicles 12, 12a to 12c is as shown in FIGS. 1, 8, 11 and 14. However, for example, from the standpoint of controlling the posture of the vehicle body 52, the invention is not limited to such features. For example, it is possible for the converter 30 on the side of the vehicle to be eliminated.

[5A-3. Energizing Arm 28]

According to each of the above-described embodiments, the arm 28 is arranged so as to be capable of being deployed laterally on the right side of the vehicle body 52 (see FIGS. 2 and 3). However, for example, from the standpoint of controlling the posture of the vehicle body 52, the invention is not limited to this feature, and the arm 28 may be arranged on a left side, an upper side, or a lower side of the vehicle body 52. It should be noted, in the case that the arrangement of the arm 28 is changed, it becomes necessary for the arrangement of the external power lines 170 of the power supplying apparatus 14 also to be changed.

According to each of the above-described embodiments, when the energizing arm 28 comes into proximity and contacts the contact-type power supplying portion 152, the arm 28 is rotated about the axis of rotation 50 (see FIG. 2). However, for example, from the standpoint of controlling the posture of the vehicle body 52, the invention is not limited to this feature. For example, it is possible for a mechanism to be provided that displaces the arm 28 linearly, and which causes the arm 28 to approach and come into contact linearly with the contact-type power supplying portion 152.

In the above described embodiment, the axis of rotation 50 of the energizing arm 28 is arranged on a front side in the direction of travel of the vehicle 12 (see FIG. 2). However, for example, from the standpoint of controlling the posture of the vehicle body 52, the invention is not limited to this feature. For example, the axis of rotation 50 can be arranged on a rear side in the direction of travel.

5B. External Power Supplying Apparatus 14

[5B-1. External Power Lines 170]

According to each of the above-described embodiments, the external power lines 170 are disposed in a straight line shape (see FIG. 2). However, for example, from the standpoint of controlling the posture of the vehicle body 52, the external power lines 170 may be disposed along a curved road.

[5B-2. Other Features]

According to each of the above-described embodiments, the external converter 154 is controlled by the control device 162, whereby the power supply voltage Vs of the external power lines 170 is controlled. However, for example, in the case that the power source 150 is constituted in the form of an aggregation of multiple DC power sources (e.g., batteries) connected together in series, it is possible to eliminate the converter 154 and the control device 162.

5C. Vehicle Body Posture Control

[5C-1. Generally]

Two, three, or all of the respective vehicle body posture controls in the first through fourth embodiments are capable of being combined.

[5C-2. Detection of Arm Angle θarm]

According to each of the above-described embodiments, the rotational angle of the axis of rotation 50 is detected as the arm angle θarm (see FIG. 2). However, detection of the arm angle θarm is not limited to this method. For example, a camera (not shown) that is capable of capturing an image of the arm 28 at the time of deployment and during deployment may be provided, and the arm angle θarm can be detected based on the image that is captured by the camera. Further, detection of the arm angle θarm need not only be performed by monitoring the state of the arm 28 itself (as a direct, indicator), and the arm angle θarm can be detected by monitoring the state of an object (indirect indicator) that differs from the arm 28. For example, the distance between the vehicle body 52 and the external power lines 170 or the power line retaining section 172 can be determined by a non-contact sensor such as an infrared sensor or the like, and the arm angle θarm can be detected based on such a distance.

[5C-3. Target Value of Arm Angle θarm]

According to each of the above-described embodiments, the arm angle θarm is controlled so as to become the target arm angle θarm, which is a single specific value (step S19 of FIG. 6, step S37 of FIG. 9, step S47 of FIG. 12, and step S57 of FIG. 15). However, for example, from the standpoint of controlling the posture of the vehicle body 52, the invention is not limited to this feature. For example, a target range of arm angles θarm may be set, and the arm angle θarm may be controlled so as to lie within the target range.

[5C-4. Other Features]

According to the third embodiment, the posture of the vehicle 12 is controlled by adjusting the left and right distribution of the motor drive power (FIGS. 12 and 13). However, for example, from the standpoint of adjusting the left and right distribution of the drive powers of the drive sources, the invention is not limited to this feature. For example, as in the configurations of U.S. Patent Application Publication No. 2005/0217921 and Japanese Laid-Open Patent Publication Mo. 2011-131618, it is possible to adjust the left and right distribution using a mechanism (drive power distribution mechanism) that distributes the drive power of a single drive source (engine, motor, or the like).

According to the first embodiment, initiation of contact of the arm 28 with the external power lines 170 (step S12 of FIG. 6: YES) serves as a trigger for starting automatic control of the steering reaction force Fstr (steps S14 through S20). However, the trigger that initiates the automatic control of the steering reaction force Fstr is not limited to such a technique. For example, the fact that an angle Av formed between the direction of travel of each of the vehicles 12, 12a to 12c and the advancing direction of the travel path 190 or the external power lines 170 has become a predetermined value (for example, that both directions have become parallel) can serve as a trigger. The same feature applies as well to the second through fourth embodiments.

The angle Av can be determined, for example, based on a contact position Ph with the power lines 170 on the head 60 (a position on a virtual horizontal plane), and the arm angle θarm. For example, in the case that the contact surface of the head 60 with respect to the power lines 170 is of an arcuate shape, the angle Av can be calculated based on the contact position Ph and the arm angle θarm. Further, the contact position Ph with the power lines 170 on the head 60 can be detected by providing a two-dimensional contact-type pressure sensor on the contact surface of the head 60.

5D. Other Features

In each of the above-described embodiments, a configuration has been described in which only supply of electrical power to the vehicle 12 from the power supplying apparatus 14 is carried out. However, conversely, the present invention is capable of being applied to a configuration in which supply of power from the vehicle 12 to the power supplying apparatus 14 is carried out. In this case, insofar as generation of power can be performed by a generator from gasoline or the like in the vehicle 12, it is possible not to provide the battery 24 or another energy storage device for supplying electrical power to the traction motor 20.

In each of the above-described embodiments, the present invention is applied to a case in which supply of power by direct current is performed with respect to the vehicle 12 from the power supplying apparatus 14. However, for example, from the standpoint of controlling the posture of the vehicle body 52 during charging in a state in which the energizing arm 28 is deployed, it is possible for the present invention to foe applied to a case in which supply of power toy an alternating current is performed with respect to the vehicle 12 from the power supplying apparatus 14. In such a case, the energizing arm 28 and the contact-type power supplying portion 152, respectively, are replaced with structures (e.g., structures equipped with a power supplying coil and a power receiving coil) for performing non-contact charging (wireless supply of power).

The invention claimed is:

1. An electric vehicle, comprising:
    a power source;
    an energizing arm including a fixed end connected rotatably with respect to a vehicle body, a free end configured to be capable of being displaced in a vehicle widthwise direction accompanying rotation at the fixed end, and a conductive member arranged between the fixed end and the free end, and within the conductive member, the fixed end side being connected electrically with the power source;

an angle detector configured to detect an angle of rotation of the energizing arm;

a contact detector configured to detect contact of the free end with respect to external power lines; and a posture control device configured to control the vehicle body;

wherein during traveling of the electric vehicle, when the contact detector detects contact of the free end, the posture control device is configured to control the vehicle body so that the angle of rotation of the energizing arm approaches a target angle of rotation or a range of target angles of rotation, wherein when the energizing arm is not in contact with the external power lines, an angle of rotation of the energizing arm reaches an initial deployment target angle, which is set to a maximum value of an arm angle, and wherein the energizing arm approaches the external power lines in a state of projecting out farthest from the vehicle body of the vehicle in a predetermined angular velocity.

2. The electric vehicle according to claim 1, wherein:

the electric vehicle is equipped with an electric power steering mechanism;

the electric power steering mechanism comprises:

a steering system;

a steering reaction force imparting device configured to impart a reaction force to the steering system; and a steering reaction force control device configured to control the steering reaction force imparting device; and the steering reaction force control device is configured to:

generate the steering reaction force in the steering reaction force imparting device so as to suppress a change in a steering angle of the steering system, in an event it is determined that the angle of rotation of the energizing arm coincides with the target angle of rotation or in an event it is determined that the angle of rotation of the energizing arm lies within the range of target angles of rotation; and generate the steering reaction force in the steering reaction force imparting device so as to cause the angle of rotation of the energizing arm to approach the target angle of rotation or the range of target angles of rotation, in an event it is determined that the angle of rotation of the energizing arm does not coincide with the target angle of rotation or in an event it is determined that the angle of rotation of the energizing arm does not lie within the range of target angles of rotation.

3. The electric vehicle according to claim 1, wherein:

the electric vehicle further comprises:

a toe angle control actuator configured to control a toe angle of steered wheels; and a toe angle control device configured to control the toe angle control actuator;

wherein the toe angle control device is configured to:

control the toe angle control actuator so as to suppress a change in the toe angle, in an event it is determined that the angle of rotation of the energizing arm coincides with the target angle of rotation or in an event it is determined that the angle of rotation of the energizing arm lies within the range of target angles of rotation; and control the toe angle control actuator so as to cause the angle of rotation of the energizing arm to approach the target angle of rotation or the range of target angles of rotation, in an event it is determined that the angle of rotation of the energizing arm does not coincide with the target angle of rotation or in an event it is determined that the angle of rotation of the energizing arm does not lie within the range of target angles of rotation.

4. The electric vehicle according to claim 1, wherein:

the electric vehicle further comprises a drive power distribution adjusting mechanism configured to adjust a drive power distribution of left and right drive wheels; and the drive power distribution adjusting mechanism is configured to:

maintain the drive power distribution, in an event it is determined that the angle of rotation of the energizing arm coincides with the target angle of rotation or in an event it is determined that the angle of rotation of the energizing arm lies within the range of target angles of rotation; and change the drive power distribution so as to cause the angle of rotation of the energizing arm to approach the target angle of rotation or the range of target angles of rotation, in an event it is determined that the angle of rotation of the energizing arm does not coincide with the target angle of rotation or in an event it is determined that the angle of rotation of the energizing arm does not lie within the range of target angles of rotation.

5. The electric vehicle according to claim 1, wherein:

the electric vehicle further comprises a braking force distribution adjusting mechanism configured to adjust a braking force distribution of left and right wheels; and the braking force distribution adjusting mechanism is configured to:

maintain the braking force distribution, in an event it is determined that the angle of rotation of the energizing arm coincides with the target angle of rotation or in an event it is determined that the angle of rotation of the energizing arm lies within the range of target angles of rotation; and change the braking force distribution so as to cause the angle of rotation of the energizing arm to approach the target angle of rotation or the range of target angles of rotation, in an event it is determined that the angle of rotation of the energizing arm does not coincide with the target angle of rotation or in an event it is determined that the angle of rotation of the energizing arm does not lie within the range of target angles of rotation.

6. An electric vehicle, comprising:

a power source;

an energizing arm including on one end a power receiving portion that contacts external power lines arranged in a line shape along a travel path, and another end of which is connected electrically to the power source;

an arm displacement mechanism configured to displace the energizing arm outwardly of a vehicle body during traveling; and a posture control device configured to, when the electric vehicle is traveling while the power receiving portion is in contact with the external power lines, maintain or change the electric vehicle so as to maintain a predetermined contact state between the external power lines and the power receiving portion, or so as to bring about the predetermined contact state, wherein when the energizing arm is not in contact with the external power lines, an angle of rotation of the energizing arm reaches an initial deployment target angle, which is set to a maximum value of an arm angle, and wherein the energizing arm approaches the external power lines in a state of projecting out farthest from the vehicle body of the vehicle in a predetermined angular velocity.

* * * * *